(12) United States Patent
Middelberg et al.

(10) Patent No.: US 10,994,947 B2
(45) Date of Patent: May 4, 2021

(54) OVERHEAD REVERSE DIVERT SYSTEMS AND METHODS

(71) Applicant: Bell and Howell, LLC, Durham, NC (US)

(72) Inventors: Neal J. Middelberg, Apex, NC (US); Craig S. Adcock, Raleigh, NC (US); Taner Lee Howard, Raleigh, NC (US); Mark Gerard Paul, Raleigh, NC (US); Richard Johnson, Fuquay Varina, NC (US)

(73) Assignee: Bell and Howell, LLC, Durham, NC (US)

( * ) Notice: Subject to any disclaimer, the term of this patent is extended or adjusted under 35 U.S.C. 154(b) by 0 days.

(21) Appl. No.: 16/381,733

(22) Filed: Apr. 11, 2019

(65) Prior Publication Data

US 2019/0315575 A1    Oct. 17, 2019

Related U.S. Application Data

(60) Provisional application No. 62/656,214, filed on Apr. 11, 2018, provisional application No. 62/657,431, filed on Apr. 13, 2018.

(51) Int. Cl.
*B65G 47/64* (2006.01)
*B65G 47/84* (2006.01)

(52) U.S. Cl.
CPC ......... *B65G 47/642* (2013.01); *B65G 47/841* (2013.01); *B65G 2201/025* (2013.01)

(58) Field of Classification Search
CPC ...... B65G 47/642; B65G 47/82; B65G 47/71; B65G 2201/025; B65G 47/841

(Continued)

(56) References Cited

U.S. PATENT DOCUMENTS

| 4,253,573 | A | | 3/1981 | Dubberly et al. |
| 5,042,636 | A | * | 8/1991 | Underwood ........... B65G 47/71 |
| | | | | 198/440 |

(Continued)

FOREIGN PATENT DOCUMENTS

| JP | H0432414 A | 2/1992 |
| JP | H0565131 A | 3/1993 |

(Continued)

OTHER PUBLICATIONS

International Search Report and Written Opinion for Application No. PCT/US2019/027010 dated Jul. 3, 2019.

*Primary Examiner* — Mark A Deuble
(74) *Attorney, Agent, or Firm* — Jenkins, Wilson, Taylor & Hunt, P.A.

(57) ABSTRACT

An overhead reverse diverter for diverting cartons passing under the diverter along a primary transport path, the diverter including a diverter frame arranged over a space through which the cartons move along the primary transport path, a divert belt, and one or more divert paddles attached to the divert belt. The divert belt may be movable along a movement profile when the diverter is triggered to divert one or more of the cartons from the primary transport path, such that the one or more divert paddles are configured to sweep through the space through which the cartons pass as the divert belt moves along the movement profile to divert one or more of the cartons from the primary transport path along one or more divert paths.

38 Claims, 11 Drawing Sheets

(58) Field of Classification Search
USPC .................................................. 198/370.08
See application file for complete search history.

(56) References Cited

U.S. PATENT DOCUMENTS

| | | | | |
|---|---|---|---|---|
| 5,275,272 A * | 1/1994 | Ydoate | ................ | B65G 47/841 |
| | | | | 198/367 |
| 6,189,702 B1 * | 2/2001 | Bonnet | .................. | B65G 47/82 |
| | | | | 198/370.02 |
| 6,868,957 B2 * | 3/2005 | Cassoli | ................ | B65G 47/841 |
| | | | | 198/370.08 |
| 8,714,339 B2 * | 5/2014 | Brun | ...................... | B65H 29/16 |
| | | | | 198/370.07 |
| 2004/0094388 A1 * | 5/2004 | Van Liempd | ........ | B65G 47/766 |
| | | | | 198/370.08 |
| 2010/0012463 A1 * | 1/2010 | Duchemin | ........... | B65G 47/841 |
| | | | | 198/437 |

FOREIGN PATENT DOCUMENTS

| WO | WO 2014/113774 A1 | 7/2014 |
|---|---|---|
| WO | WO 2018/007397 A1 | 1/2018 |
| WO | WO 2019/200113 A1 | 10/2019 |

\* cited by examiner

OVERHEAD REVERSE DIVERT SYSTEMS AND METHODS

CROSS-REFERENCE TO RELATED APPLICATIONS

The present application claims priority to both U.S. Provisional Patent Application Ser. No. 62/656,214, filed Apr. 11, 2018, and U.S. Provisional Patent application Ser. No. 62/657,431, filed Apr. 13, 2018, the entire disclosures of which are incorporated by reference herein.

TECHNICAL FIELD

The subject matter disclosed herein relates generally to article or package processing. More particularly, the subject matter disclosed herein relates to systems and methods for diverting articles and/or package moving along a transport path.

BACKGROUND

The sorting of objects, including, for example, boxes, cartons, containers, and the like, generally has a provision for at least one diverter mechanism to move designated objects from the main sort path onto a secondary sort conveyor and/or a designated receptacle. Conventional diverters typically use a single actuator that is either pneumatically or electromagnetically actuated. It is generally necessary to use two separate conventional diverters when it is necessary to divert an object in one of two lateral directions from the direction of transit along the main sort path. These actuators are commonly used because of low cost and simple operation, where they can be triggered via sensor(s) or controlled by a PLC where time delays can be added if needed. Such linear actuators typically do not incorporate any kind of motion control, meaning that when actuated a corresponding arm, paddle, etc. is extended at full speed to divert the designated object. More complex diverters are also known, but these require stepper, servo, or some other motor drive control that forces a plate or guide to be raised or lowered in the path of the object to be diverted; such diverters are typical in the paper handling industry, where diverting a sheet of paper up or down is more practical than moving it left or right. As such, there exists a need for configurable bi-directional diverters that are able to operate at variable force and velocity profiles with lower cost and complexity from conventionally known diverters.

SUMMARY

An overhead reversible (e.g., bi-directional) diverter, also referred to herein as an overhead reverse diverter, is disclosed herein. Such a diverter allows objects, including, for example, cartons, moving along a transport conveyor defining a main sort path to be diverted to either side of the transport conveyor in a smooth controlled fashion. There are several different ways such a diverter can be used. In a first example embodiment, such a diverter can selectively remove objects from the transport conveyor while the transport conveyor remains in motion. For example, in embodiments where objects are inspected (e.g., visually, by weight, etc.) upstream (e.g., relative to the main sort path) of the diverter, it is advantageous to divert objects that are less than a specified mass threshold to the left of the main sort path, while objects having unreadable (e.g., illegible) information (e.g., expiration date, lot number, etc.) printed/formed on the object to the right of the main sort path. Such bi-directional divert functionality allows line operators to discern between instances where the contents of the objects are within specification or not. In some such embodiments, it may be necessary to discard the contents of the underweight objects, whereas the contents of the objects with illegible printing may be recycled back into production to be reinserted into new objects (e.g., cartons).

In another embodiment, such a diverter may be used to "split" a transport path into two separate secondary transport paths. In an example of such an embodiment where the packing line is a production bottleneck, it may be advantageous to have two independent packing lines, each packing line being configured to receive the objects from one of the two secondary transport paths to match the throughput of the upstream cartoning system. In such applications, the diverter alternates divert direction to split the line equally. In some other embodiments, the diverter may be able to detect an error or backlog scenario in one of the packing lines and may then be configured to divert the objects only to the remaining functional packing line. In further embodiments, it may be advantageous, by nature of the controllable motion profile provided by the disclosed overhead diverter, to use the diverter to divert one or more objects from a diverter onto three or more secondary transport paths.

In an example embodiment, an overhead reverse diverter configured to divert cartons passing under the diverter along a primary transport path is provided. According to this embodiment, the diverter comprises: a diverter frame arranged over a space through which the cartons move along the primary transport path; a divert belt; and one or more divert paddles attached to the divert belt; wherein the divert belt is movable along a movement profile when the diverter is triggered to divert one or more of the cartons from the primary transport path, such that the one or more divert paddles are configured to sweep through the space through which the cartons pass as the divert belt moves along the movement profile to divert one or more of the cartons from the primary transport path along one or more divert paths.

In some embodiments of the diverter, the one or more divert paddles comprise at least three divert paddles.

In some embodiments of the diverter, the one or more divert paths comprises a plurality of divert paths. In some such embodiments of the diverter, two or more divert paths of the plurality of divert paths are arranged on opposite sides of the primary transport path proximate to the space through which the cartons pass under the diverter. In some such embodiments, the two or more divert paths are oriented substantially orthogonally to the primary transport path.

In some embodiments of the diverter, the one or more divert paths comprises a plurality of divert paths. In some such embodiments of the diverter, the movement profile comprises oscillating forward and reverse movements of the divert belt, such that the diverter is configured to divert the cartons onto the plurality of divert paths in an alternating manner.

In some embodiments of the diverter, the one or more divert paths comprise a first divert path; and the diverter is configured to divert at least one of the cartons onto the first divert path from the primary transport path.

In some embodiments of the diverter, the one or more divert paths comprise a first divert path and a second divert path; the diverter is configured to divert a first subset of the cartons onto the first divert path from the primary transport path when a first condition is detected; and the diverter is configured to divert a second subset of the cartons onto the second divert path from the primary transport path when a second condition is detected. In some such embodiments of the diverter, the diverter is configured to allow a third subset of the cartons to continue beyond the diverter along the primary transport path. In some such embodiments of the diverter, at least one of the first and second conditions comprises an error condition.

In some embodiments of the diverter, the movement profile has a variable speed and/or force.

In some embodiments of the diverter, the one or more divert paddles are configured for repeated actuation without the one or more divert paddles returning to a zero position.

In some embodiments, the diverter comprises a first divert spindle and a second divert spindle, wherein the first and second divert spindles are attached to the diverter frame, such that the first and second divert spindles are spaced apart from each other in a plane that is not parallel to a transport direction of the cartons along the primary transport path; the divert belt wraps around and frictionally engages with the first and second divert spindles; and at least the first divert spindle is configured to be driven by a rotary force, such that the divert belt is driven about the first and second divert spindles. In some such embodiments, the diverter comprises a divert motor configured to generate the rotary force imparted to the first divert spindle; wherein the second divert spindle is an idler spindle that rotates as the divert belt is rotatably driven by the first divert spindle. In some such embodiments, the diverter comprises a transfer case configured to transfer the rotary force from the divert motor to the first divert spindle.

In some embodiments, the diverter comprises a first divert spindle and a second divert spindle, wherein the first and second divert spindles are attached to the diverter frame, such that the first and second divert spindles are spaced apart from each other in a plane that is not parallel to a transport direction of the cartons along the primary transport path; the divert belt wraps around and frictionally engages with the first and second divert spindles; and at least the first divert spindle is configured to be driven by a rotary force, such that the divert belt is driven about the first and second divert spindles. In some such embodiments of the diverter, the first divert spindle is coupled to a divert belt drive shaft, which is rotatably coupled to the diverter frame; and the second divert spindle is coupled to a divert belt idler shaft, which is rotatably coupled to the diverter frame.

In some embodiments, the diverter comprises a first divert spindle and a second divert spindle, wherein the first and second divert spindles are attached to the diverter frame, such that the first and second divert spindles are spaced apart from each other in a plane that is not parallel to a transport direction of the cartons along the primary transport path; the divert belt wraps around and frictionally engages with the first and second divert spindles; and at least the first divert spindle is configured to be driven by a rotary force, such that the divert belt is driven about the first and second divert spindles. In some such embodiments of the diverter, the plane in which the first and second divert spindles are spaced apart is oriented substantially orthogonally to the transport direction of the cartons along the primary transport path, such that the movement profile of the divert belt is oriented substantially orthogonally to the transport direction of the cartons along the primary transport path.

In some embodiments of the diverter, the movement profile of the divert belt comprises movements of the divert belt in at least two directions; and the at least two directions are substantially diametrically opposite from each other.

In some embodiments, the diverter comprises at least one homing sensor configured to detect when at least one of the one or more divert paddles is in a zero position.

In some embodiments, the diverter comprises at least one trigger sensor configured to detect when one or more of the cartons are in a divert position under the diverter.

In some embodiments, the diverter comprises a stop plate configured to stop multiple cartons, which are to be diverted from the primary transport path onto a first divert path of the one or more divert paths, in a divert position under the diverter. In some such embodiments of the diverter, the stop plate is movable into and out of the primary transport path based on a number of cartons to be diverted substantially simultaneously from the primary transport path onto the first divert path.

In some embodiments of the diverter, the cartons are transported along the primary transport path and under the diverter by a transport conveyor.

In another example embodiment, a method of diverting cartons from a primary transport path using an overhead reverse diverter is provided. According to this embodiment, the method comprises: moving the cartons along the primary transport path; arranging or positioning a diverter frame over a space through which the cartons move along the primary transport path; attaching a divert belt to the diverter frame so that the divert belt is suspended over the primary transport path; attaching one or more divert paddles to the divert belt; triggering a movement of the divert belt along a movement profile; sweeping at least one of the one or more divert paddles across the primary transport path; and diverting one or more of the cartons from the primary transport path onto one or more divert paths.

In some embodiments of the method, the one or more divert paddles comprise at least three divert paddles.

In some embodiments of the method, the one or more divert paths comprises a plurality of divert paths. In some such embodiments, the method comprises arranging two or more divert paths of the plurality of divert paths on opposite sides of the primary transport path proximate to the space through which the cartons pass under the diverter. In some such embodiments of the method, the two or more of the plurality of divert paths are oriented substantially orthogonally to the primary transport path.

In some embodiments of the method, the one or more divert paths comprises a plurality of divert paths. In some such embodiments of the method, the movement profile comprises oscillating forward and reverse movements of the divert belt, such that the cartons are diverted onto the plurality of divert paths from the primary transport path in an alternating manner.

In some embodiments of the method, the one or more divert paths comprise a first divert path, such that at least one of the cartons is diverted onto the first divert path from the primary transport path.

In some embodiments, the one or more divert paths comprises a first divert path and a second divert path, the method comprising: diverting a first subset of the cartons onto the first divert path from the primary transport path when a first condition is detected; and diverting a second subset of the cartons onto the second divert path from the primary transport path when a second condition is detected. In some such embodiments, the method comprises allowing a third subset of the cartons to continue beyond the diverter along the primary transport path. In some such embodiments of the method, at least one of the first and second conditions comprises an error condition.

In some embodiments of the method, the movement profile has a variable speed and/or force.

In some embodiments, the method comprises repeatedly actuating the one or more divert paddles to sweep across the primary transport path without returning to a zero position.

In some embodiments, the method comprises: attaching a first divert spindle and a second divert spindle to the diverter frame, such that the first and second divert spindles are spaced apart from each other in a plane that is not parallel to a transport direction of the cartons along the primary transport path; wrapping the divert belt around the first and second divert spindles to frictionally engage the divert belt with the first and second divert spindles; and rotating, via a rotary force, the first divert spindle, such that the divert belt is driven about the first and second divert spindles. In some such embodiments, the method comprises: generating the rotary force using a divert motor; transmitting the rotary force to the first divert spindle; and rotating the first divert spindle; wherein the second divert spindle is an idler spindle that rotates as the divert belt is rotatably driven by the first divert spindle. In some such embodiments of the method, transmitting the rotary force to the first divert spindle comprises attaching a transfer case to transfer the rotary force from the divert motor to the first divert spindle.

In some embodiments, the method comprises: attaching a first divert spindle and a second divert spindle to the diverter frame, such that the first and second divert spindles are spaced apart from each other in a plane that is not parallel to a transport direction of the cartons along the primary transport path; wrapping the divert belt around the first and second divert spindles to frictionally engage the divert belt with the first and second divert spindles; and rotating, via a rotary force, the first divert spindle, such that the divert belt is driven about the first and second divert spindles. In some such embodiments, the method comprises: coupling the first divert spindle to a divert belt drive shaft, which is rotatably coupled to the diverter frame; and coupling the second divert spindle to a divert belt idler shaft, which is rotatably coupled to the diverter frame.

In some embodiments, the method comprises: attaching a first divert spindle and a second divert spindle to the diverter frame, such that the first and second divert spindles are spaced apart from each other in a plane that is not parallel to a transport direction of the cartons along the primary transport path; wrapping the divert belt around the first and second divert spindles to frictionally engage the divert belt with the first and second divert spindles; and rotating, via a rotary force, the first divert spindle, such that the divert belt is driven about the first and second divert spindles. In some such embodiments of the method, the plane in which the first and second divert spindles are spaced apart is oriented substantially orthogonally to the transport direction of the cartons along the primary transport path, such that the movement profile of the divert belt is oriented substantially orthogonally to the transport direction of the cartons along the primary transport path.

In some embodiments of the method, the movement profile of the divert belt comprises movements of the divert belt in at least two directions, and the at least two directions are substantially diametrically opposite from each other.

In some embodiments, the method comprises detecting, using at least one homing sensor, when at least one of the one or more divert paddles is in a zero position.

In some embodiments, the method comprises detecting, using at least one trigger sensor, when one or more of the cartons is in a divert position under the diverter.

In some embodiments, the method comprises: stopping, using a stop plate, multiple cartons, which are to be diverted from the primary transport path onto a first divert path of the one or more divert paths, in a divert position under the diverter; and diverting the at least two of the cartons along the first divert path. In some such embodiments, the method comprises moving the stop plate into and out of the primary transport path based on a number of cartons to be diverted substantially simultaneously from the primary transport path onto the first divert path.

In some embodiments, the cartons are transported along the primary transport path and under the diverter by a transport conveyor.

BRIEF DESCRIPTION OF THE DRAWINGS

The features and advantages of the present disclosure will be more readily understood from the following detailed description which should be read in conjunction with the accompanying, example figures that are given merely by way of explanatory and non-limiting example. The detailed description that follows this section references the example figures briefly described below.

DETAILED DESCRIPTION

The disclosure herein is described with reference to example embodiments, but it is understood that the disclosure herein can be embodied in many different forms and should not be construed as limited to the embodiments set forth herein.

Figure 1:
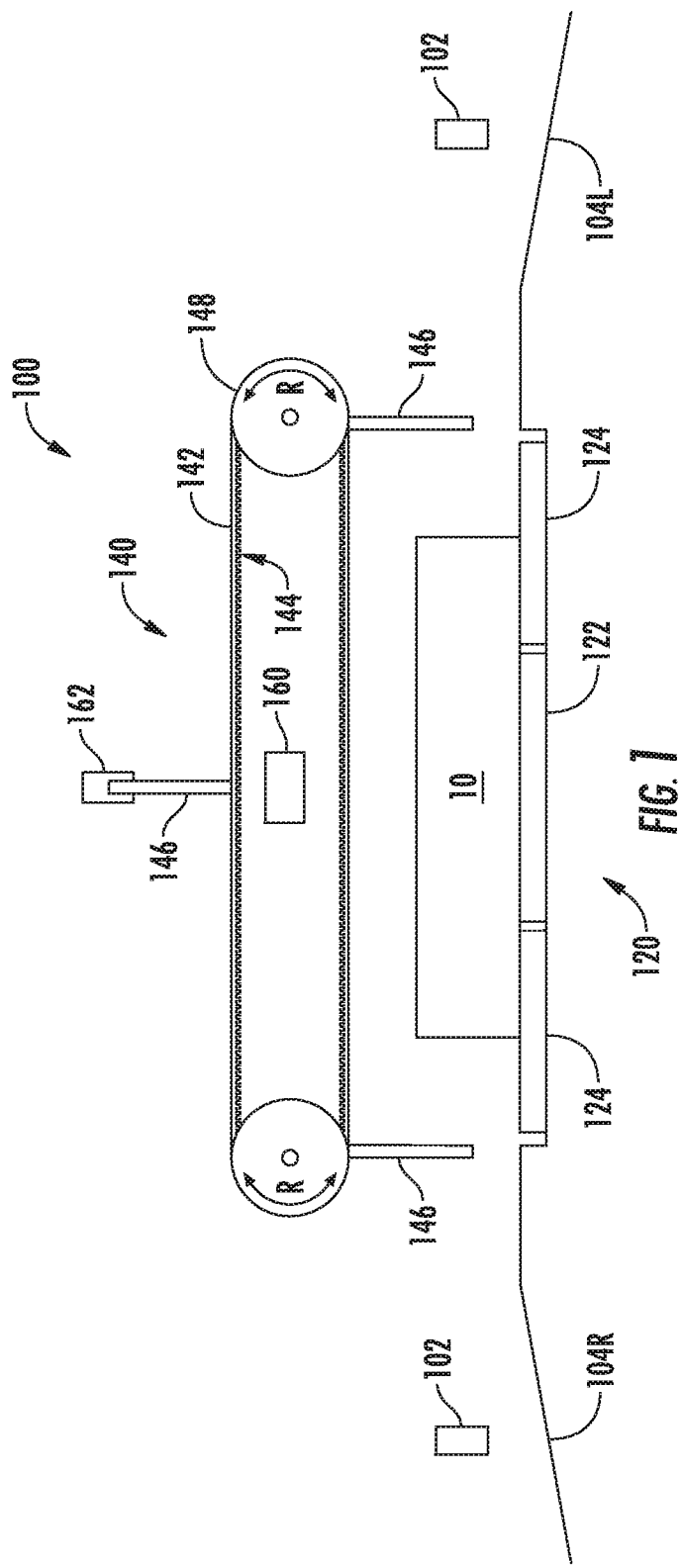
FIG. 1 is a schematic rear view of an overhead reverse diverter, according to the disclosure herein.

FIG. 1 shows a schematic illustration of an example embodiment of an overhead reverse diverter, generally designated 100, as seen from a rear direction relative to movement of one or more cartons 10 along a primary transport path, generally designated 120. Elsewhere herein, the overhead reverse diverter 100 may be referred to interchangeably as an overhead reversible diverter, as the divert belt 142 and the divert paddles 146 affixed thereto may move and/or rotate bidirectionally (e.g., can reverse the direction of movement and/or rotation thereof). The cartons 10 can be external packaging for an item being processed or such items themselves when they have a suitable shape for processing without the need for any external packaging. The cartons 10 move along the primary transport path 120 by interfacing via friction with a transport belt 122. The transport belt 122 has an outer surface with a high coefficient of friction, so that relative movement (e.g., slipping) between the cartons 10 and the transport belt 122 is prevented. The transport belt 122 has one or more lateral supports 124 positioned on and/or along the lateral sides thereof. The lateral supports 124 can be formed from discrete lateral portions and/or from a continuous (e.g., monolithic) structure over which the transport belt 122 is arranged. In an advantageous embodiment, the lateral supports 124 have an outer surface with a low coefficient of friction (e.g., lower than that of the transport belt 122) to allow the cartons to slide over the lateral supports 124 without causing relative movement between the cartons 10 and the transport belt 122 as the cartons 10 move along the primary transport path 120. In some example embodiments, the lateral supports 124 can comprise metal and/or plastic materials, but any material may be selected so long as the coefficient of friction thereof is sufficiently lower than that of the transport belt 122 to allow the cartons 10 to slide over the lateral supports without causing relative movement between the cartons 10 and the transport belt 122 as the cartons 10 move along the primary transport path 120.

The overhead reverse diverter 100 is configured to receive one or more cartons 10 that are moving along the primary transport path 120 defined by the transport direction T of the cartons 10 moving along transport belt 122. In the embodiment shown, when one or more cartons 10 are detected, the cartons 10 are diverted laterally from the primary transport path 120, at an angle of substantially 90° from the orientation of the transport belt 122, along one or more divert paths, generally designated 104L, 104R. In the embodiment shown, a left divert path 104L and a right divert path 104R are shown, however any suitable number of divert paths is contemplated. The overhead reverse diverter 100 comprises at least a divert belt 142 with at least one divert paddle 146 fixedly attached thereto. The divert belt 142 is engaged around at least one, but preferably at least two in the embodiment shown, divert spindles 148, which rotate in a same direction R and at a same speed to cause a movement of the drive belt 142 thereabout. The divert belt 142 is rotatable around the divert spindles 148 by rotating the divert spindles 148 in unison in the counterclockwise or clockwise directions, depending on which divert path (e.g., 104L or 104R) is selected for the carton(s) 10 to be diverted along. This movement of the drive belt 142 causes a corresponding movement of one or more divert paddles 146 attached to the divert belt 142. The divert paddle(s) 146 move at a substantially similar speed as the drive belt 142. In some embodiments, the divert paths 104L, 104R can be angled with respect to the orientation of the transport conveyor at an angle of more or less than 90°, such as in embodiments where the divert paddle(s) 146 are attached to the divert belt 142 at an angle relative to the direction R of the divert belt 142 around the divert spindles 148.

In the example embodiments shown herein, the overhead reverse diverter 100 has three divert paddles 146 which are rigidly attached to the divert belt 142 and oriented such that the plane defined by each divert panel is substantially orthogonal to the direction of movement caused by the divert belt 142 moving about the divert spindles 148. The overhead reverse diverter 100 goes through a homing routine upon initialization to move the divert belt 142 into the proper orientation (e.g., a "zero" position) so that two of the three divert paddles 146 are straddling the transport belt 122 and the third is pointing upward in the center. This is accomplished by using homing sensor 162, which is a photoelectric sensor in the embodiment shown, but can be any other suitable type of sensor, to detect the presence of one of the divert paddles 146 when such divert paddle 146 is in the zero or "home" position. Once the divert belt 142 has been rotated/moved so that one divert paddle 146 is in the "home" position, a controller sends a "ready" signal to the controller for the primary transport path 120 to move cartons 10 along the transport belt 122 and into the overhead reverse diverter 100. The overhead reverse diverter 100 is configured to receive, when the overhead reverse diverter 100 is operating as a selective diverter, a divert trigger signal and a divert direction signal from the controller for the primary transport path 120. The divert trigger signal and the divert direction signal can be sent as separate signals or combined into a single signal.

For example, when a carton 10 is traveling down the transport belt 122 that is identified by the controller for the primary transport path 120 as needing to be diverted (e.g., for normal sorting or due to a manufacturing fault), the controller for the primary transport path 120 is configured to track the carton 10 until there is no other carton 10 between the carton 10 that is identified to be diverted and the overhead reverse diverter 100. Once the carton 10 to be diverted is adjacent to (e.g., is the next carton 10 to enter) the overhead reverse diverter 100, the controller for the primary transport path 120 transmits the divert trigger signal and/or the divert direction signal to the overhead reverse diverter 100. The transmission of one or more of these signals to the overhead reverse diverter 100 causes the overhead reverse diverter 100 to activate trigger sensor 160, which is located in a region above the transport belt 122 in the embodiment shown. Trigger sensor 160 can be any suitable presence-detection sensor. The controller for the overhead reverse diverter 100 is configured to monitor trigger sensor 160 to detect the carton 10 that is intended to be diverted. Once the carton 10 blocks, interrupts, or otherwise triggers the trigger sensor 160, a timer can be initialized in some embodiments. In embodiments where no delay function is required for a certain type of item or carton 10, the timer can be deactivated and/or set as a zero value timer. Once the timer counts down, the divert motor 152 is initialized to rotate the divert spindles 148 to move the divert belt 142 in the direction indicated by the divert direction signal. The divert belt 142 will turn until the next divert paddle 146 blocks the homing sensor 162, thereby indicating that the divert paddles 146 are in the "home" or zero position, thus ensuring that the divert belt 142 has moved the designated distance needed to clear the identified carton 10 off of the transport belt 122 and onto one of the divert paths 104L, 104R. When the overhead reverse diverter 100 is operating as a selective diverter, the divert cycle must be set to occur faster than the time between cartons 10 moving along the primary transport path 120 so that cartons 10 to not enter the overhead reverse diverter 100 before one of the divert paddles is in the home position, otherwise it may be possible for the carton 10 to strike one or more of the divert paddles 146 while the divert paddles 146 are in motion, which can cause the carton 10 to become misaligned and lead to a malfunction of the overhead reverse diverter 100, requiring operator intervention and leading to system downtime and/or physical damage to the carton 10.

To prevent relative movement (e.g., slipping) between the divert belt 142 and the divert spindles 148, the divert belt 142 has a plurality of belt teeth 144 formed on an inner surface thereof, while the divert spindles 148 have meshing teeth (see spindle teeth 148T, FIG. 4) to produce a gear-like interface between the divert belt 142 and the divert spindles 148. This gear-like interface allows for operation of the overhead reverse diverter 100 without requiring a discrete sensor, such as homing sensor 162, to detect the position of the divert paddle(s) 146, such that the divert belt 142 does not slip relative to the divert spindles 148, thereby allowing the divert paddle(s) to move out of the "home" positions and block the entrance into the overhead reverse diverter 100 due to such slipping. In some embodiments the divert spindles 148 and/or the divert belt 142 may have a high-friction surface to minimize slippage therebetween. In some such embodiments, a position sensor (e.g., homing sensor 162) can be used to ensure that the divert paddle(s) 146 do not remain positioned in the inlet path of the overhead reverse diverter 100 when the overhead reverse diverter 100 is not actively diverting one or more cartons 10.

Figure 2:
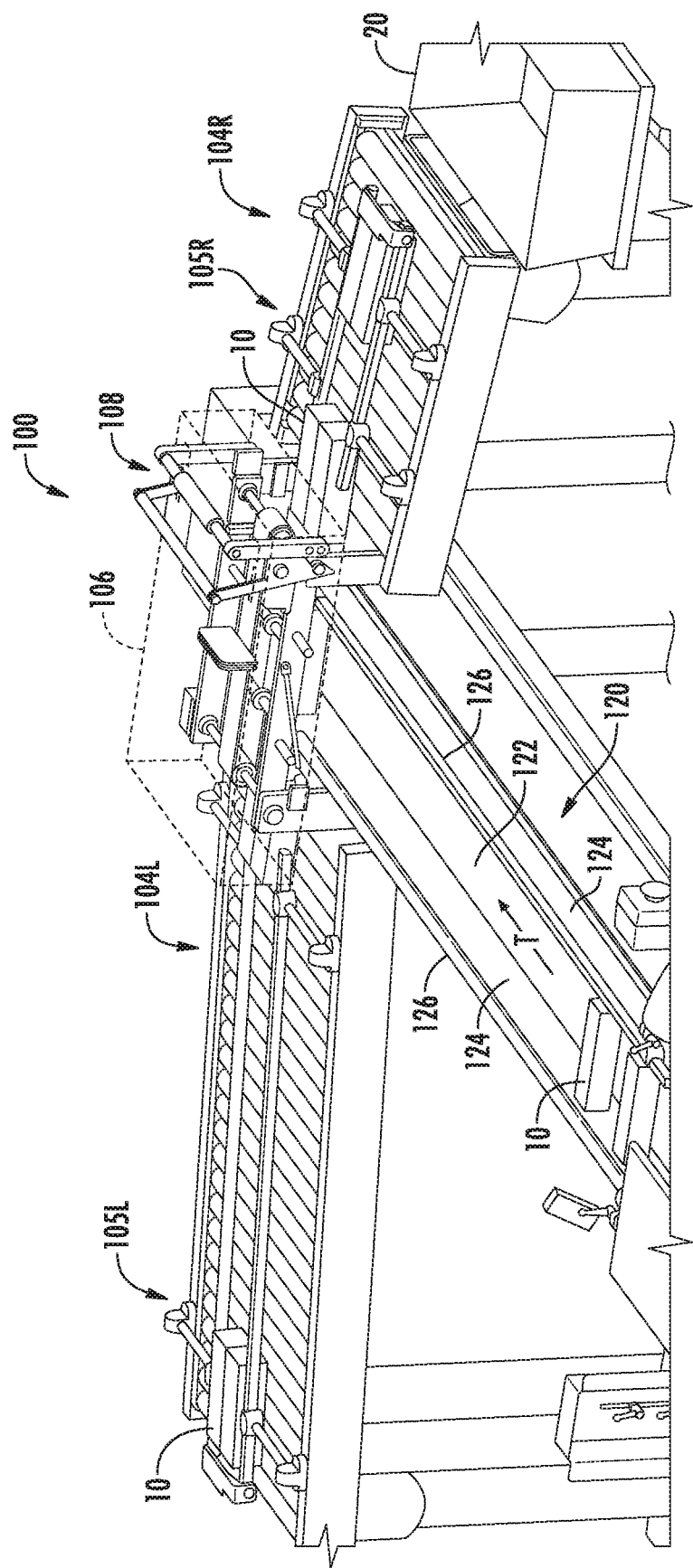
FIG. 2 is an isometric view of an example embodiment of a system comprising an overhead reverse diverter.

FIG. 2 is an isometric view of an example embodiment of a system comprising an overhead reverse diverter 100 installed at one end of a primary transport path 120 to receive and subsequently divert cartons 10 in pairs along either a left divert path 104L or a right divert path 104R, which are oriented substantially orthogonally to the transport direction T of the cartons 10 on the transport belt 122. While cartons 10 are shown being processed and diverted by the overhead reverse diverter 100 in the embodiment shown, any suitable objects may be transported into the overhead reverse diverter 100 by the transport belt 122, which runs underneath, at least partially, the overhead reverse diverter 100. Such objects can include, for example, any of boxes, cartons, containers, and the like. Since the diverter is configured, in at least this example embodiment, to divert the cartons 10 in pairs, a stop plate 128 is installed (i.e., via rigid attachment to the overhead reverse diverter 100) to hold a "leading" carton 10 in position while a "trailing" carton is delivered to, and enters, the overhead reverse diverter 100 to form the pair of cartons 10 to be diverted. The lead and trailing cartons 10 are detected by the overhead reverse diverter 100, for example, by the trigger sensor 160 comprising photocells, lasers, and the like, and the overhead reverse diverter 100 is then activated to "sweep" the pair of cartons 10 onto and along one of the left and right divert paths 104L, 104R, according to the specified method of operation of the overhead reverse diverter 100. The left and right divert paths 104L, 104R each have a respective set of left and right divert path guides 105L, 105R that guide the cartons 10 along the respective left and right divert paths 104L, 104R.

In the embodiment shown, the stop plate 128 is generally aligned with a rear one (e.g., relative to the transport direction T) of the left and right divert path guides 105L, 105R so the pairs of cartons 10 being diverted are aligned with the left and right divert paths 104L, 104R defined by the respective left and right divert path guides 105L, 105R along the designated divert path 104L, 104R. In some embodiments, the overhead reverse diverter 100 may be configured to divert a different quantity of cartons along one divert path (e.g., the left divert path 104L) than is to be diverted along the other divert path (e.g., the right divert path 104R). In some embodiments, the stop plate 128 is configured to be movable into and out of the conveyor path to allow cartons 10 to either collect under the overhead reverse diverter 100 or to continue moving along the transport belt 122. In some embodiments, the left and right divert path guides 105L, 105R may have a length that is less than an entire length of the respective left and right divert path 104L, 104R. In some embodiments, the left and/or right divert paths 104L, 104R may lead to one or a receptacle 20, a further transport belt for further processing and/or sorting, or any system capable of performing any desirable secondary functionality. In some embodiments having a movable stop plate 128, the transport belt 122 may continue on the outlet side of the overhead reverse diverter, thereby providing at least a third sort path for the overhead reverse diverter 100. In some embodiments, the overhead reverse diverter 100 is configured to "sweep" one or more cartons 10 at an angle onto a path allowing for more than three paths; one example of such a fourth path may be onto a roller ball mat.

In some embodiments, the overhead reverse diverter 100 has a protective cover 106, which is shown in broken line in FIG. 2. Cover 106 can be made of an opaque material, but is preferably made of an at least semi-translucent or clear material, such as a plastic material. The cover 106 is configured to prevent unintended contact between external objects (e.g., other system components or a part of the operator's body or clothing) and the internal components of the overhead reverse diverter 100. A handle mechanism, generally designated 108, protrudes through the cover 106 to allow the overhead reverse diverter 100 to be pivoted up for service, maintenance, or other corrective actions, including clearing a jam.

Figure 3:
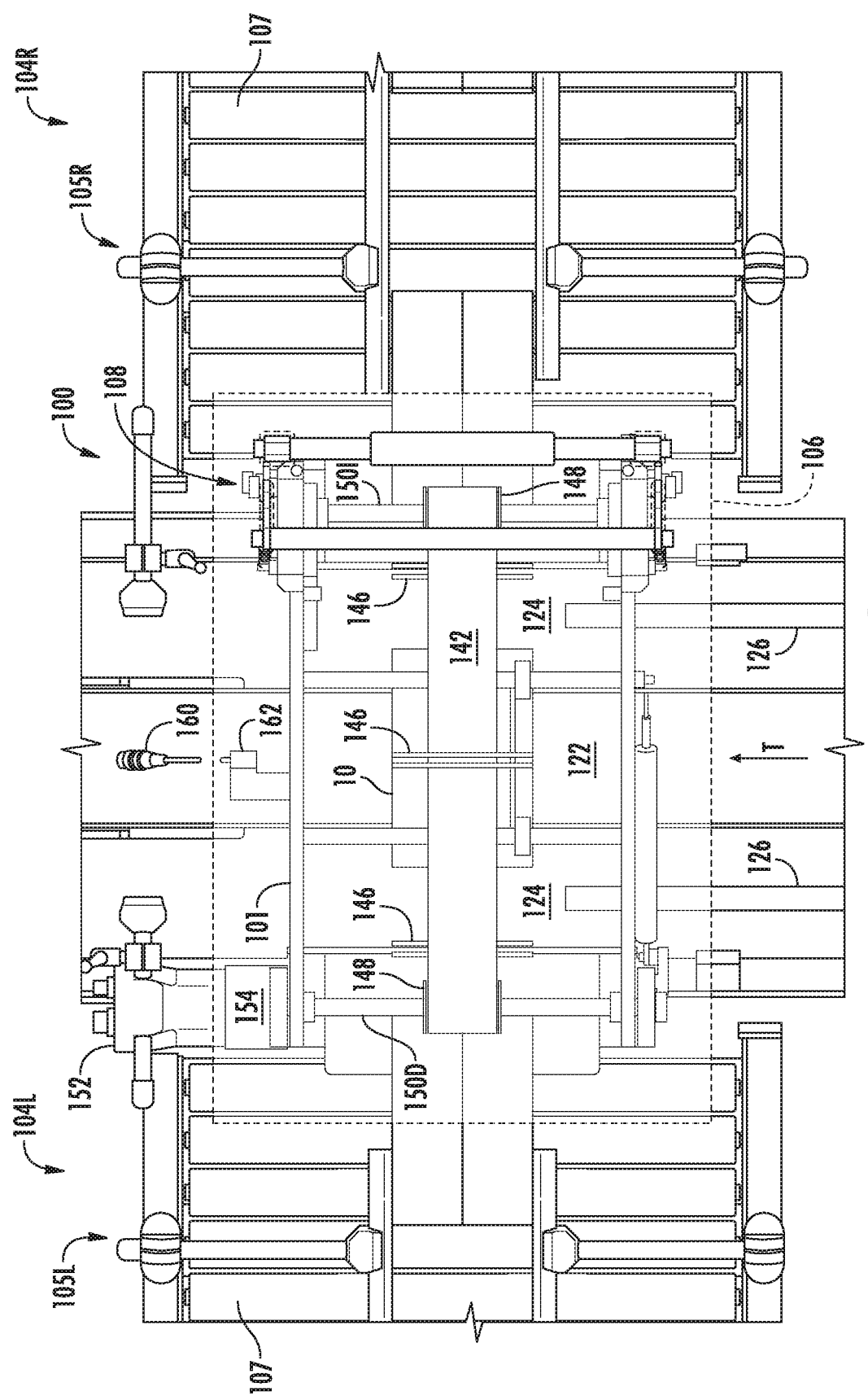
FIG. 3 is a top plan view of a portion of the system comprising the overhead reverse diverter of FIG. 2.

FIG. 3 is a top plan view of a portion of the system comprising the overhead reverse diverter 100 of FIG. 2, with the majority of the primary transport path 120 being omitted for clarity. As shown, the divert belt 142 is rotatably engaged about two divert spindles 148 that are rotatably connected to one of a driven shaft 150D and an idler shaft 150I, respectively. As shown in FIG. 3, the overhead reverse diverter 100 has a divert motor 152 configured to drive the rotary movement of the divert belt 142, which has three divert paddles attached thereto, about the rotary diver spindles 148 and over the transport belt 122 to sweep off carton(s) 10 designated to be diverted from the primary transport path 120. The divert motor 152 is connected to the divert belt 142 through a transfer case 154 (e.g., any suitable transmission device, including geared and belt-driven), the driven shaft 150D, and the driven divert spindle 148 attached to the driven shaft 150D. The overhead reverse diverter 100 can be controlled to divert in at least two opposing directions by rotating the driven shaft 150D, and therefore also the divert spindle 148 rigidly attached thereto, as well as the divert belt 142 and the divert paddles 146, in either of the clockwise or counter-clockwise directions. Divert motor 152 can, in some embodiments, be an intelligent motor (e.g., a stepper or servo motor) such that the motion profile of the divert paddles 146 can be programmed as needed to ensure smooth movement of the divert paddles 146 through the sweeping motion across the transport belt 122 depending on the size, mass, etc. of the carton 10 being diverted. For example, some cartons 10 may have contents that are very fragile, while other cartons 10 can be impacted by the divert paddles 146 without concern of being damaged by such contact.

The overhead reverse diverter 100 can be configured to be retrofit onto an existing conveyor system. Because the diverter is installed on top of the conveyor, there is no requirement to modify the existing structure of such conveyor systems, saving installation time, improving reliability, and reducing the overall cost. Such an overhead reverse diverter 100 can be configured for use on a diverse range of products (e.g., cartons 10) by adjusting the height of the overhead reverse diverter 100 relative to the transport belt 122 and/or by using differently-sized divert paddles 146. Such a overhead reverse diverter 100 is particularly well suited for applications at the end of an assembly line where alternating the actuating directions of the divert paddles 146 to dispense products onto one of a plurality of divert paths can better utilize resources performing downstream processing operations, such as when downstream processes operate at a slower throughput rate than the rate at which the cartons 10 are being transported down the primary transport path 120; one such example is case packing. In some embodiments, multiple overhead reverse diverters 100 can be installed onto and/or added to a production line with the same benefit of being able to maintain a higher production rate by providing more stations downstream for tasks requiring more processing time or which have different processing needs. In some embodiments, a carton 10 can be diverted in one direction to preserve the contents, while being diverted in another direction if the contents of that particular carton 10 is to be discarded.

As shown in FIG. 3, transport guides 126 are arranged laterally about (e.g., on opposite sides of) the transport belt 122, preferably vertically over the lateral supports 124. The transport guides 126 can comprise one or more guide rails that can be positioned at substantially any desired distance from each other, either symmetrically about or asymmetrically about the transport belt 122. The transport guides 126 can terminate before, at, or under the cover 106, but must generally terminate at a position upstream, relative to the primary transport path 120, of either of the left or right divert paths 104L, 104R. In the embodiment shown, both the left and right divert paths 104L, 104R comprise a plurality of rollers 107 that allow substantially linear movement of the cartons 10 along the respective left and right divert paths 104L, 104R. In some embodiments, the left and/or right divert paths 104L, 104R may have a curved path and, in such embodiments, the rollers 107 can be replaced, in whole or in part, with devices configured to allow omnidirectional movement relative thereto, such as, for example, a roller ball mat. In some such embodiments, however, the rollers may be arranged about a curve such that each successive roller 107 has a same or different angle from the immediately preceding roller 107 to allow for the movement of the cartons 10 along the curved left and/or right divert paths 104L, 104R. In such embodiments, the respective sets of left and right divert path guides 105L, 105R may be arranged to have a same or differently curved transport path as their respective left and/or right divert paths 104L, 104R.

Overhead reverse diverter 100 comprises an internal frame 101 which supports, either rotatably and/or fixedly, the internal components of the overhead reverse diverter 100, thereby enabling operation of the overhead reverse diverter 100. The frame comprises four substantially vertically extending legs, with two respective crossbars that are attached between opposing pairs of the legs, such that the crossbars extend substantially orthogonally to the transport direction T. The cover 106 is attached to, and positionally spaced apart from, the frame 101 by a plurality of standoffs that secure the cover 106 to the frame 101. The divert motor 152 is connected, via the transfer case 154, to the frame at a first leg of the frame. The driven shaft 150D passes through, at least partially, and connects the two crossbars together, such that the driven shaft 150D is vertically supported by first and second legs of the frame 101 and is substantially axially aligned with the transport direction T. At an opposite side of the frame 101, relative to the vertical plane defined by the transport direction T, third and fourth legs are respectively connected to the first and second crossbars. The idler shaft 150I passes through, at least partially, and connects the two crossbars together, such that the idler shaft 150I is vertically supported by third and fourth legs of the frame 101 and is also substantially axially aligned with the transport direction T. As shown, the four legs have a substantially similar vertical height so that the first and second crossbars of the frame 101 are substantially horizontally oriented and define a plane that is substantially parallel to a plane defined by the transport belt 122. The driven shaft 150D and the idler shaft 150I can be symmetric within the overhead reverse diverter 100. The driven shaft 150D and the idler shaft 150I are rotatably attached to the frame 100 by bearings, which can be of any suitable type (e.g., journal, ball, roller, etc.). The trigger sensor 160 and the homing sensor 162 are shown extending downstream, relative to the transport direction T, from the overhead reverse diverter 100, but can also be positioned in a position extending from the overhead reverse diverter 100, relative to the transport direction T.

Figure 4:
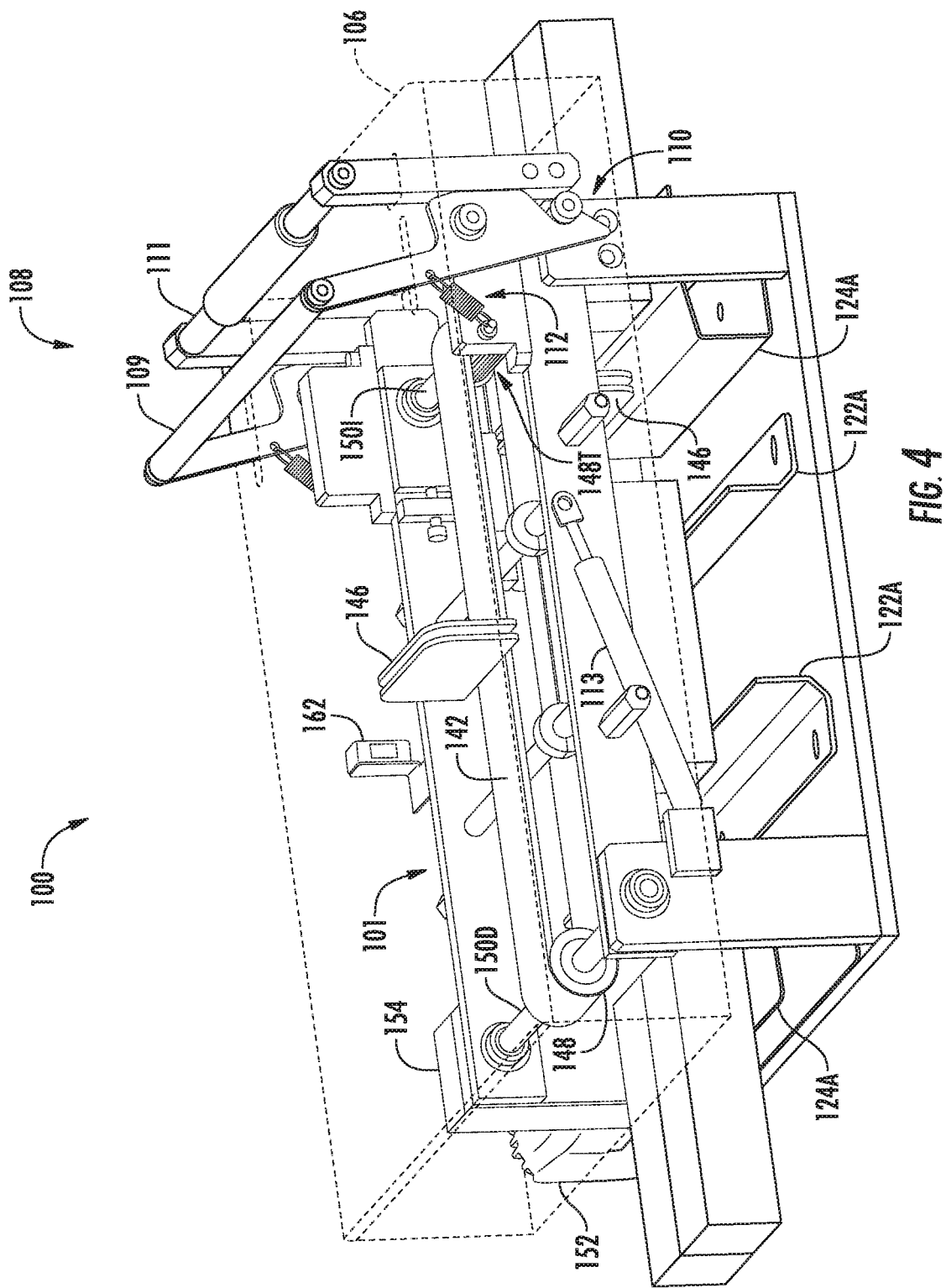
FIG. 4 is an isolated isometric view of an overhead reverse diverter, as shown in the system of FIG. 2.
Figure 5:
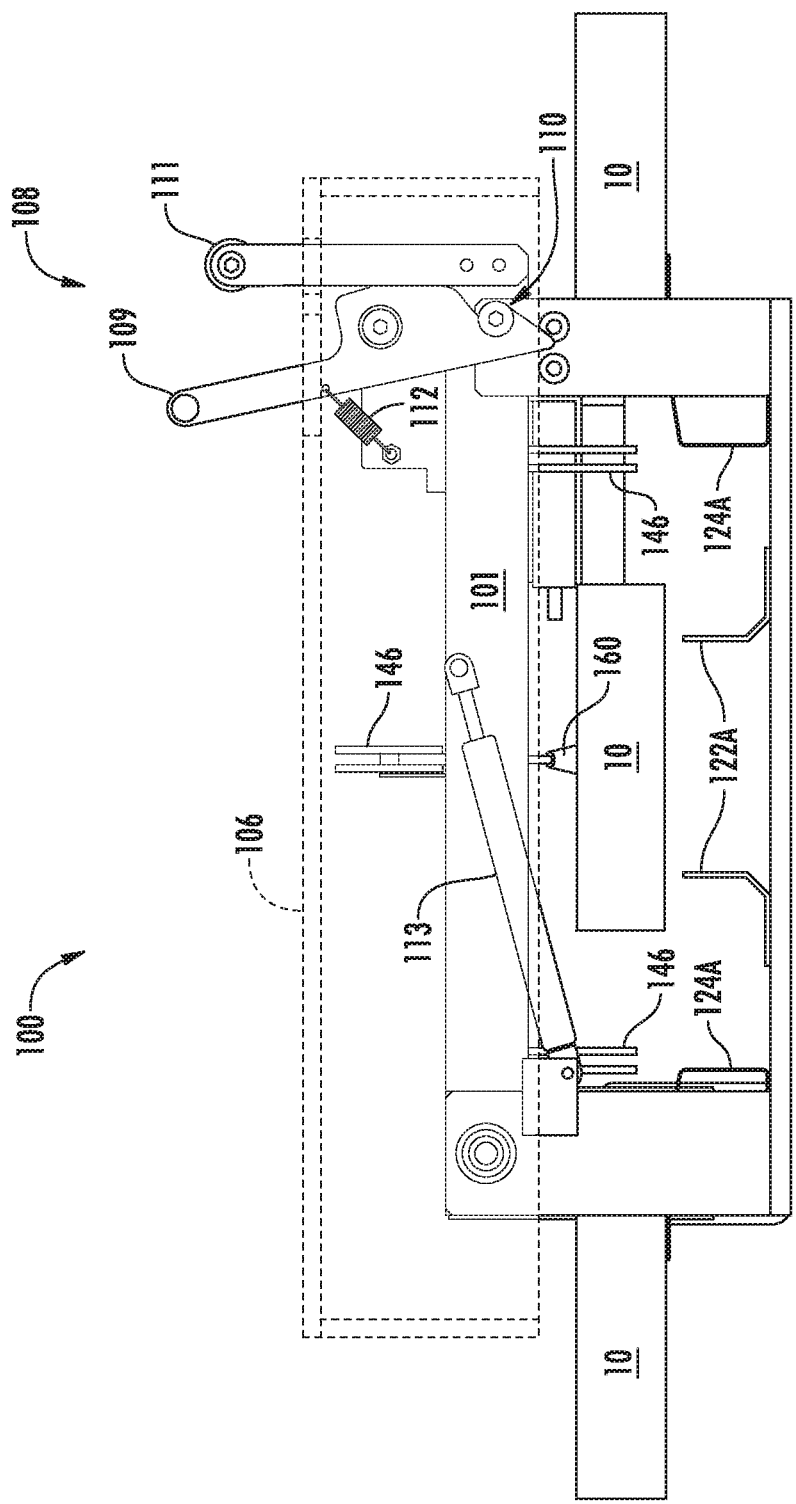
FIG. 5 is a front plan view of the overhead reverse diverter of FIG. 4.

FIGS. 4 and 5 are isolated isometric and front plan views of an overhead reverse diverter shown in the system of FIGS. 2 and 3. In these views, the primary transport path 120 and the components thereof, as well as the left and right divert paths 104L, 104R, and the constituent components thereof, are omitted entirely to better illustrate some aspects of the overhead reverse diverter 100. In this view, it can more easily be seen how the driven shaft 150D and the idler shaft 150I are connected to the crossbars of the frame 101 by bearings. Further details regarding the handle mechanism 108 are shown herein as well. The handle mechanism 108 is a two-part handle mechanism comprising a pivot handle 109 and a fixed handle 111. The fixed handle 111 is rigidly attached to the frame 101 and extends in a substantially vertical direction therefrom. The pivot handle 109 is rotatably and/or pivotably attached to a portion of the frame 101. The pivot handle 109 is configured to rotate and/or pivot about the point at which the pivot handle 109 attaches to the frame 101. The pivot handle and the frame 101 (e.g., the third and/or fourth legs thereof) have interlocking features that, when engaged together, prevent a pivoting movement of the overhead reverse diverter 100 about the first and second legs of the frame 101, thereby securing the overhead reverse diverter 100 in a substantially horizontal orientation over the primary transport path 120.

In the embodiment shown, the interlocking features are a hook integrally formed into the pivot handle 109 and a pin fixedly attached to the frame 101. The hook has a tapering form-factor that allows for the hook to engage with the pin without having to actuate the pivot handle 109 when returning the overhead reverse diverter 100 to the horizontal installed position. The hook is, however, configured so as to not be able to be disengaged from the pin without an actuation of an upper portion of the pivot handle 109 towards the fixed handle 111. A biasing element 112 (e.g., a spring or other elastic member) is provided between the frame 101 and the pivot handle 109, exerting a pivot force to maintain positive engagement of the hook about the pin. To pivot the overhead reverse diverter 100 into the service position, the pivot handle 109 and the fixed handle 111 are grasped and squeezed together so that the hook is disengaged from the pin, then the overhead reverse diverter 100 is lifted upwards to disengage from the third and fourth legs and pivot about the first and second legs of the frame 101. A strut 113 is provided to support the frame in the service position to prevent unintended pivoting of the overhead reverse diverter 100 back into the operating position. As shown, the cover 106 has a plurality of slots formed through a thickness thereof to allow for the fixed handle 111 and the pivot handle 109 to extend through the cover 106 while still allowing the pivot handle to be pivotably actuated to release the overhead reverse diverter from the operational position.

While any suitable structural supports are contemplated, FIG. 4 shows that the lateral supports (124, see FIGS. 2 and 3) are supported by, and extend at least partially over, inner and outer support members 122A, 124A, respectively, with inner support members 122A being spaced apart laterally by at least a dimension defined by the width of the transport belt (122, see FIGS. 2 and 3).

Figure 6:
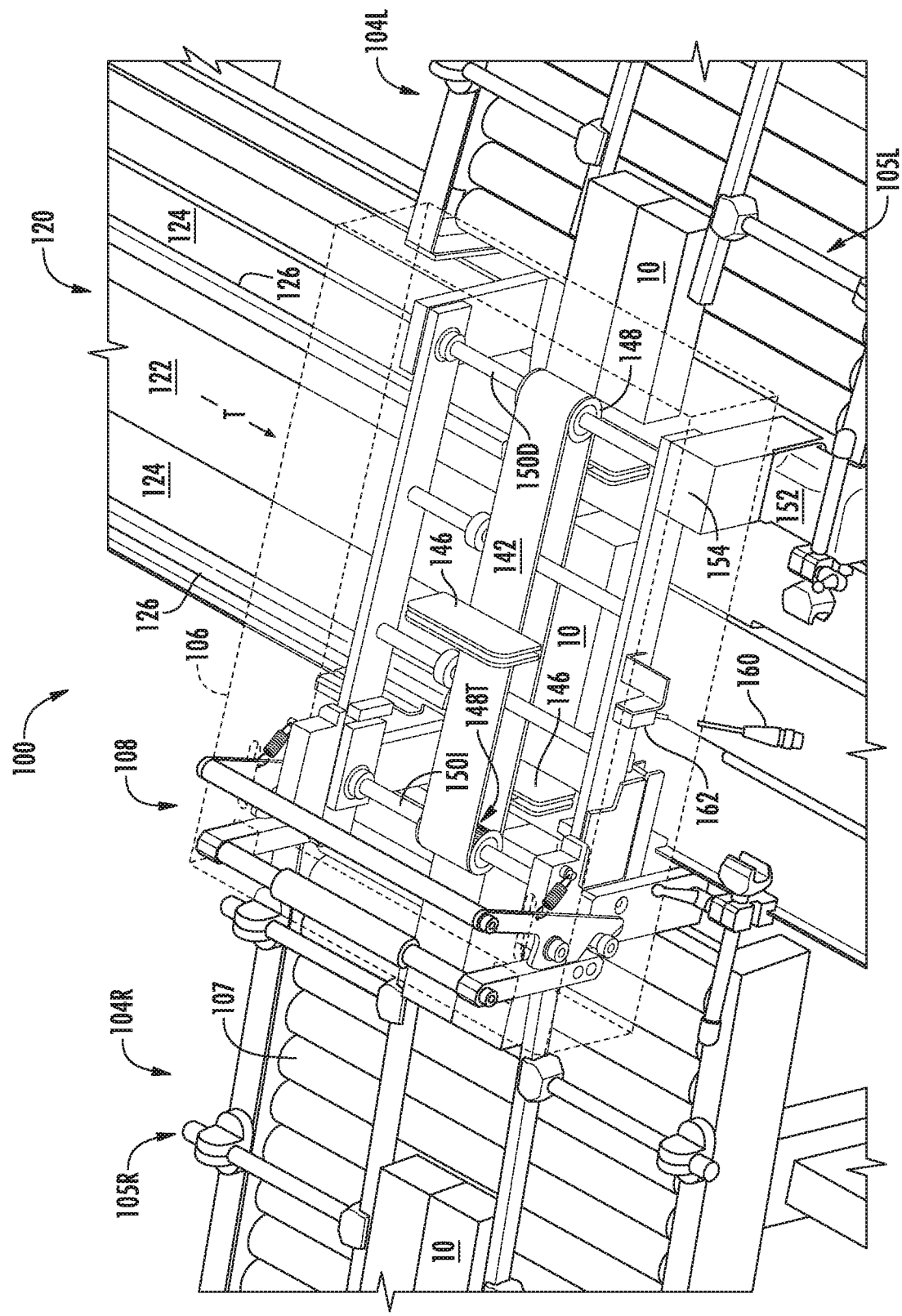
FIGS. 6 and 7 are respective elevated isometric views of a portion of the system comprising the overhead reverse diverter of FIG. 2.
Figure 7:
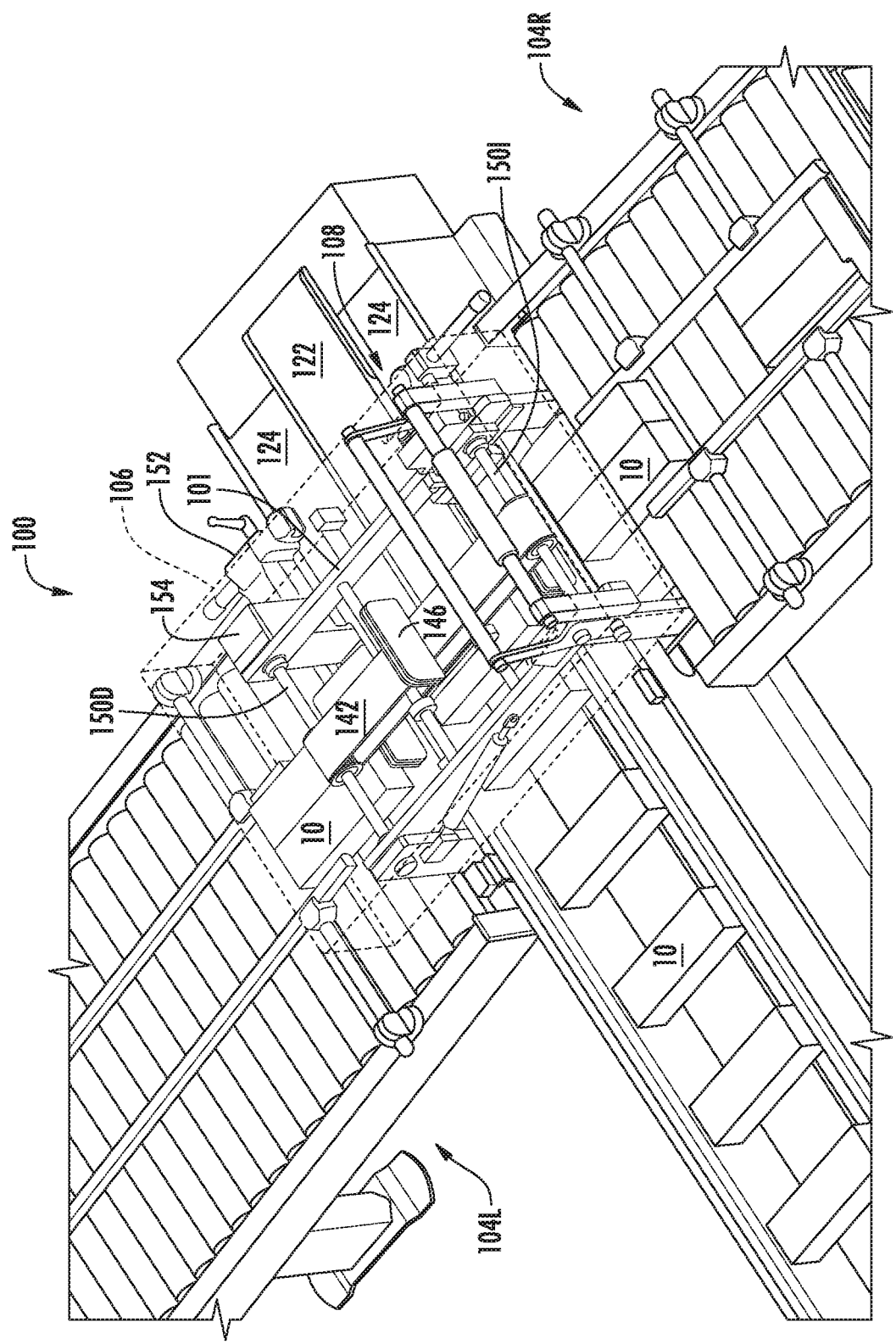
Figure 8:
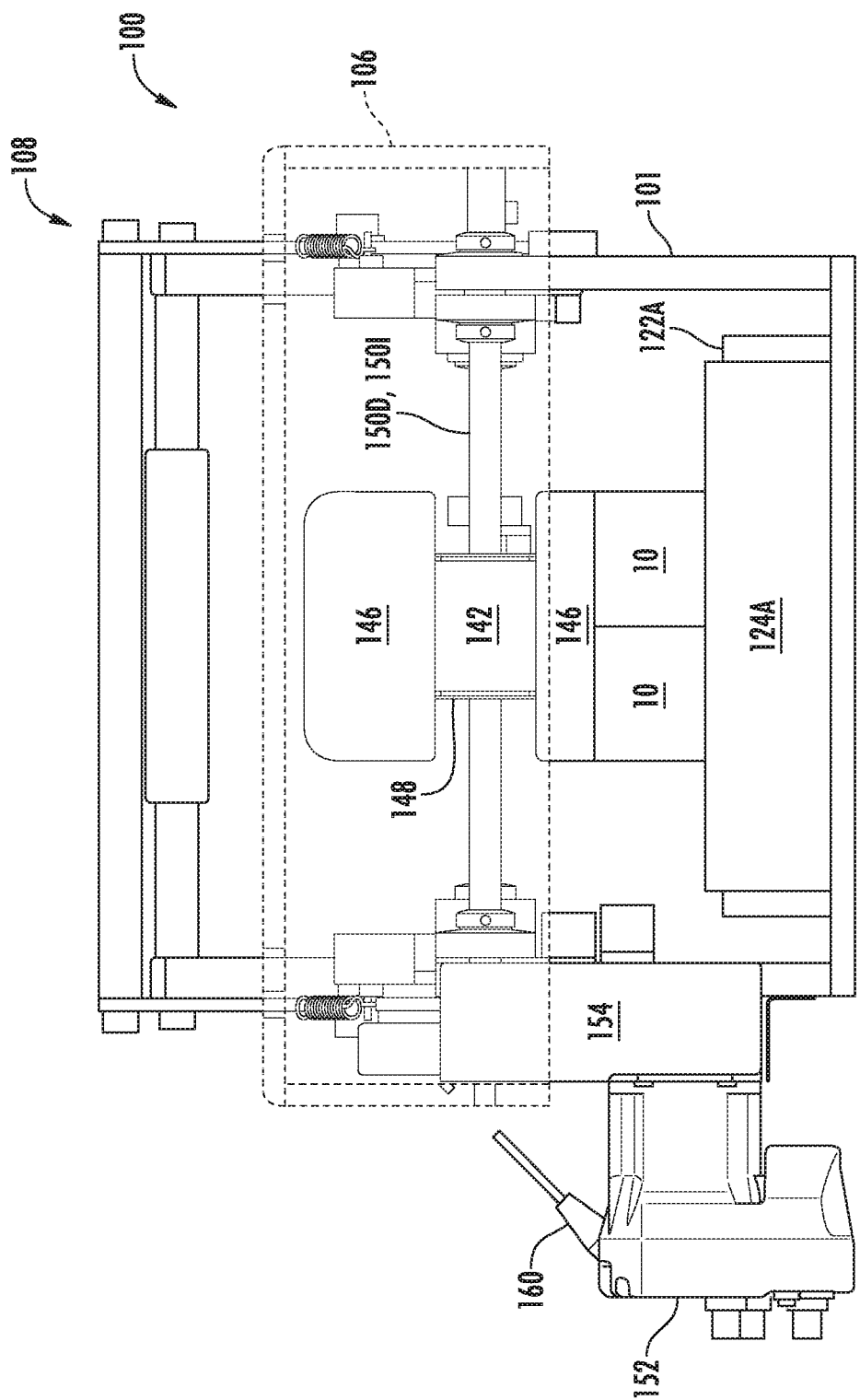
FIG. 8 is an isolated side plan view of a portion of the system comprising the overhead reverse diverter of FIG. 2.

FIGS. 6 and 7 are respective elevated isometric views of a portion of the system comprising the overhead reverse diverter 100 of FIG. 2. FIG. 8 is a side view of the overhead reverse diverter 100. As shown, the divert paddles 146 have a width that is substantially a same width as the carton(s) 10 to be diverted.

Figure 9:
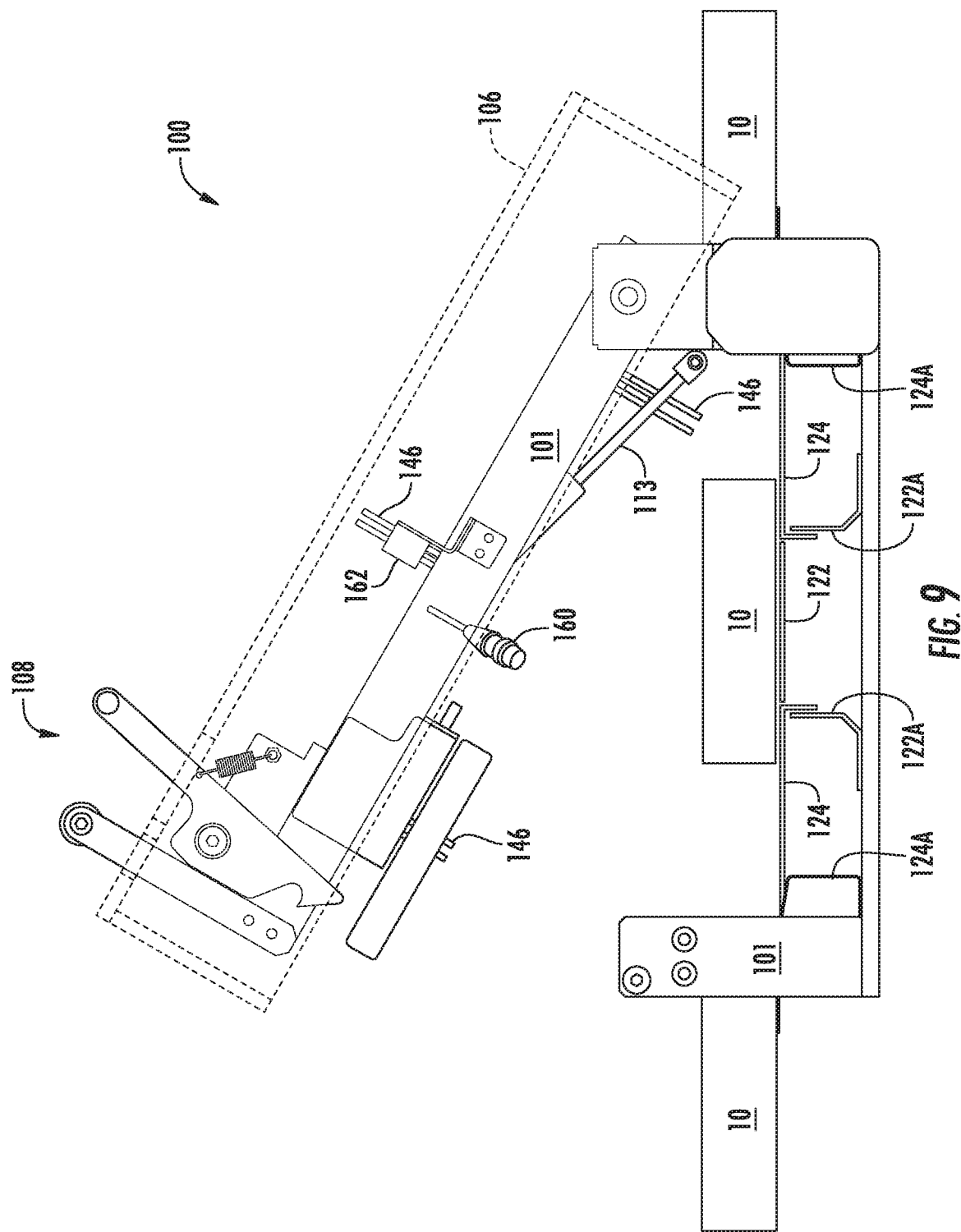
FIG. 9 is an isolated rear plan view of an overhead reverse diverter in an open position, as shown in the system of FIG. 2.
Figure 10:
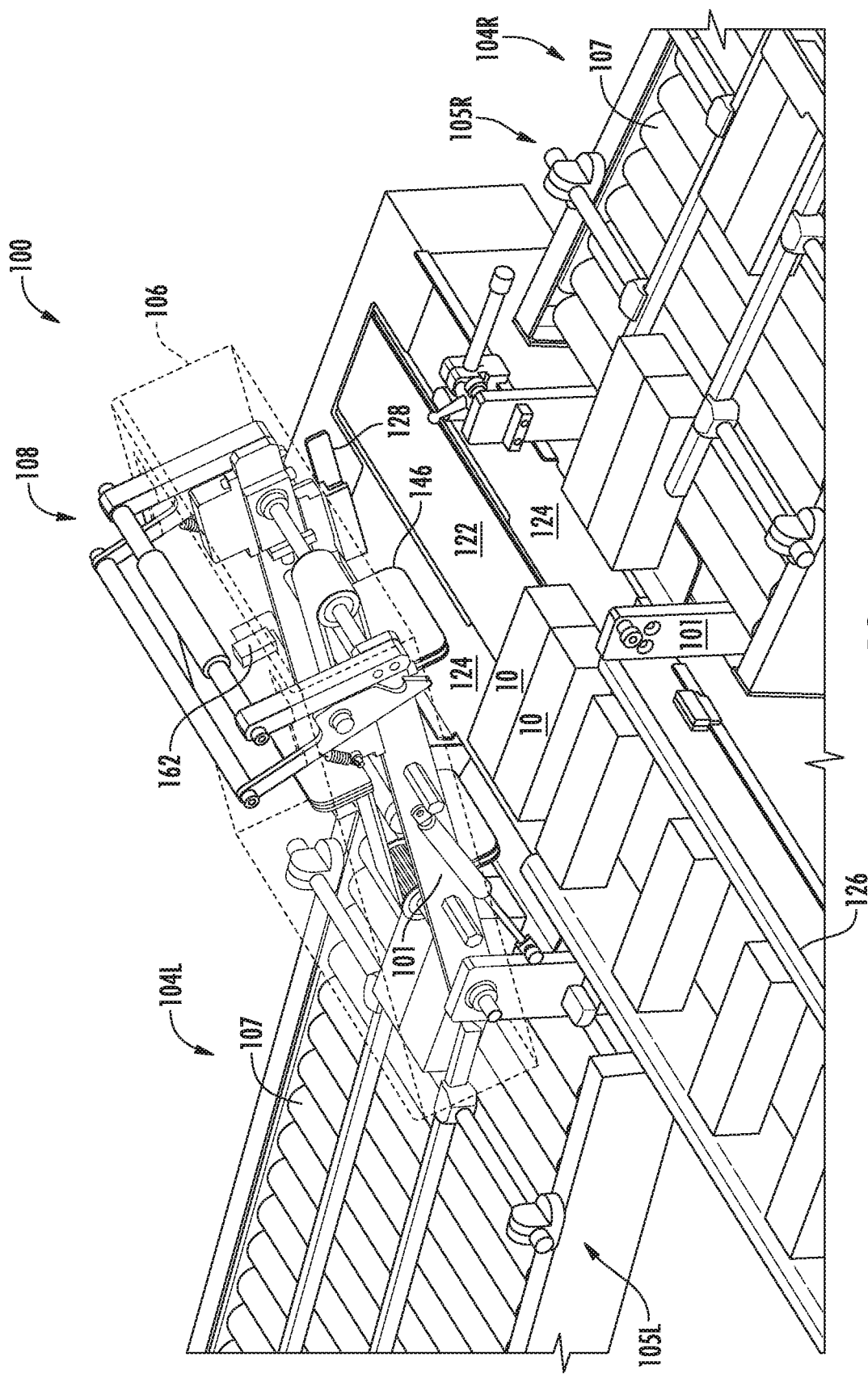
FIGS. 10 and 11 are respective elevated isometric views of a portion of the system comprising the overhead reverse diverter of FIG. 2 showing the overhead reverse diverter in an open position.
Figure 11:
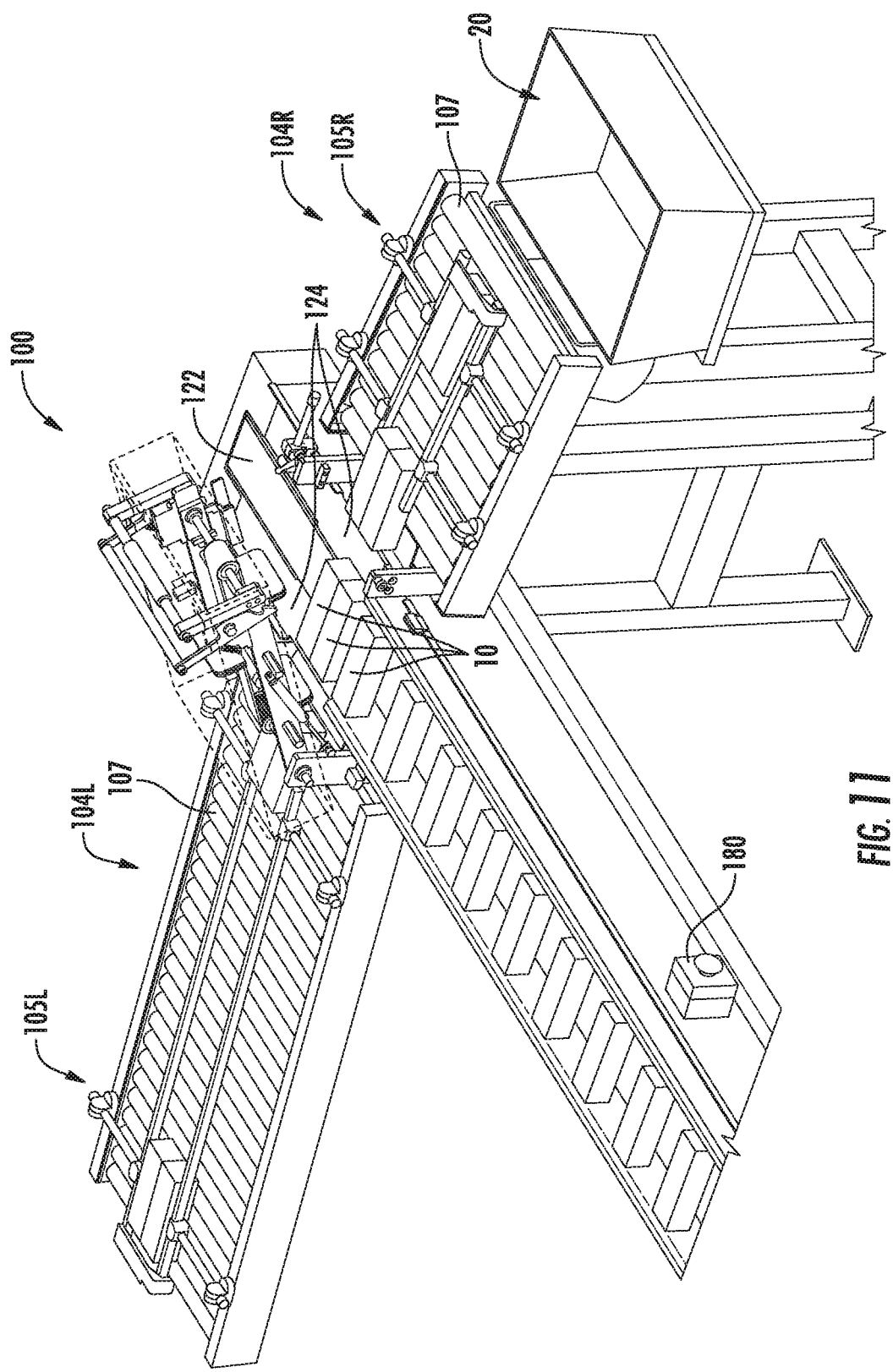

FIGS. 9-11 show the overhead reverse diverter 100 in the service position, pivoted upwards to allow access by an operator to the region within the cover 106 when the overhead reverse diverter 100 is in the operational position. A stop button can also be provided to allow an operator to stop the overhead reverse diverter 100 and/or the transport belt 122 when necessary. Similarly, actuating the handle mechanism and/or pivoting the overhead reverse diverter 100 into the service position can also automatically interrupt operation of both the overhead reverse diverter 100 and the transport belt.

In some embodiments, the overhead reverse diverter uses a divert motor to drive a divert belt with three divert paddles on it over the transport belt of the primary transport path to sweep cartons, which can be any object(s) suitable for transport along the transport belt, designated for removal from the primary transport path. When the system is initiated, a homing routine is executed to properly orient the divert belt so two of the three divert paddles are straddling, and out of the way of, the primary transport path defined by the transport belt, and the third divert paddle is pointing in a generally vertically upward direction in the center of the divert belt. This is accomplished using the homing sensor, which can be a photoelectric sensor to detect a position of one of the divert paddles when passing and/or positioned directly in front of the homing sensor. Once the divert belt has reached the "zero" home position, defined as the position in which one of the divert paddles moves to a position where it is detected by the homing sensor, a controller sends a ready signal to the controller for the primary transport path to trigger cartons to begin moving down the primary transport path.

When the overhead reverse diverter is operating as a selective diverter, a divert trigger signal and/or a divert direction signal are received from the controller for the main transport path. If a carton traveling down the transport belt is to be diverted, it must be tracked until there are no other cartons on the transport belt between the carton to be diverted and the overhead reverse diverter, at which time the divert trigger signal and direction signal is activated and transmitted to the overhead reverse diverter. Once the trigger signal is asserted, initialized, and/or transmitted, the controller for the divert motor monitors the trigger sensor to detect the carton to be diverted. Once the carton interrupts, or is otherwise detected by, the trigger sensor, a timer is started. In some embodiments, the timer could be assigned a zero value if no delay is needed for a certain carton type. Once the timer counts down to a zero value, the divert motor generates and transmits the force, via the transfer case coupled to the divert belt drive shaft, to rotate the divert spindle coupled to the divert belt drive shaft and move and/or rotate the divert belt in the direction indicated by the divert direction signal. The divert belt will move and/or rotate about the divert spindles until the next divert paddle is detected by the homing sensor. Detection of a next divert paddle by the homing sensor ensures that the divert belt has moved and/or rotated the correct amount to clear the carton from the transport belt and also ensure that there are no divert paddles obstructing, or otherwise blocking, the primary transport path that would prevent subsequent cartons from entering the overhead reverse diverter. When operating as a selective diverter, the divert cycle (e.g., the amount of time from when movement and/or rotation of the divert belt is triggered and begins moving, to when the next divert paddle is detected by the homing position and the divert belt stops moving and/or rotating) must be set to occur faster than the time between cartons moving along the primary transport path and entering the path defined by the width of the divert paddles within the overhead reverse diverter.

In embodiments where the overhead reverse diverter is being used to split a conveyor line, an enable signal is transmitted to a controller for the divert motor. When the trigger sensor detects a carton, a timer is initiated and the overhead reverse diverter automatically diverts the carton upon expiration (e.g., reaching a "0" value) of the specified timer value. In this "split" mode, the controller for the divert motor stores the immediately previous divert direction and diverts a subsequent carton in a direction opposite of the direction in which the previous carton was diverted. In some modes, the overhead reverse diverter can divert two or more cartons simultaneously, depending on carton size and divert paddle width. In some such embodiments, a stop plate is added to the overhead reverse diverter (e.g., attached to the lateral supports or other area along the primary transport path and/or on the frame, cover, or any suitable structure of the overhead reverse diverter) immediately after (or, in some embodiments, within but outside of the path traveled by the divert paddles during the sweeping motion) the overhead reverse diverter. In such embodiments, a horizontally oriented "stack" of cartons is accumulated between the divert paddles by being driven by the transport belt within the overhead reverse diverter and against the stop plate. In some embodiments, the trigger sensor is immediately upstream of the divert belt and can be used to count the accumulated cartons. Thus, for example, when a one-inch wide carton is traveling on the transport belt moving 10 inches per second, a carton will be detected by the trigger sensor for only 100 milliseconds (ms). If the trigger sensor ignores any signals of less than 100 ms, then the overhead reverse diverter can be programmed to actuate after a prescribed number of cartons have accumulated, or "stacked up", at the stop plate under the divert belt and within the overhead reverse diverter.

In some embodiments, additional sensors can be provided to generate warnings that the receptacles holding diverted cartons along one or more of the divert paths are full. If the overhead reverse diverter is operating in a selective divert mode and receives a divert trigger in the full direction, the controller for the divert motor is configured to turn off and/or deactivate the ready signal to controller for the primary transport path to stop the flow of cartons along the transport belt. If the overhead reverse diverter is operating in a line splitting fashion and either of such additional sensors becomes continuously blocked, the overhead reverse diverter may be configured to start to send all of the cartons to the unblocked side. If the overhead reverse diverter is operating in a line splitting fashion and both of such additional sensors become blocked, the controller for the divert motor may be configured to turn off the ready signal to the controller for the primary transport path to stop the flow of cartons along the transport belt.

The overhead reverse diverter has a protective cover that is configured to prevent inadvertent manipulation of the internal components of the overhead reverse diverter while in the operating position, providing added safety to the operator(s) and also to the components themselves. The cover is removably secured over the internal components of the overhead reverse diverter. A handle mechanism is provided through a surface of the cover. By actuation of the handle mechanism, a spring-loaded hook is disengaged from a pin attached to, for example, the frame of the overhead reverse diverter to allow for rotation of the overhead reverse diverter, including the divert belt, divert paddles, divert belt idler shaft, and cover, about the divert belt drive shaft. The cover has at least one security interlock that is configured to trigger a stop of the movement of one or more of the internal components of the overhead reverse diverter when the cover is not installed, is displaced from the operating position, and/or is in the service position. These security interlocks can be, for example, magnetic sensors attached, for example, to the frame and/or cover of the diverter, respectively.

In some embodiments, an overhead reverse diverter configured to divert cartons passing under the overhead reverse diverter along a transport belt defining a primary transport path is provided. In some such embodiments, the overhead reverse diverter comprises a frame arranged over a space through which the cartons pass, a divert belt, and one or more divert paddles attached to an outer surface of the divert belt, wherein the divert belt is movable through a movement profile when the overhead reverse diverter is triggered to divert one or more of the cartons from the primary transport path, such that the one or more divert paddles is configured to travel through the space through which the carton passes as the divert belt moves along the movement profile defined about the divert spindles around which the divert belt is moved and/or rotated.

In one such embodiment, the one or more divert paddles is at least three divert paddles. In another such embodiment, the one or more divert paddles are configured to divert one or more of the cartons from the primary transport path along one or more divert paths, for example along a left divert path or a right divert path. In some embodiments, the one or more divert paths comprises a plurality of divert paths. In some such embodiments, at least two of the plurality of divert paths are arranged on opposite sides of the primary transport path. In some such embodiments, the at least two divert paths of the plurality of divert paths are oriented substantially orthogonally to the primary transport path. In some such embodiments, at least two of the plurality of divert paths are arranged on opposite sides of the primary transport path and oriented substantially orthogonally to the primary transport path.

In some embodiments, the movement profile of the drive belt about the divert spindles comprises oscillating forward and reverse movements of the divert belt (e.g., in a plane that is not co-planar with the direction of the cartons on the primary transport path), such that the overhead reverse diverter is configured to divert the cartons onto the plurality of divert paths in an alternating manner. In some embodiments, the one or more divert paths comprises a first (e.g., left) divert path and the diverter is configured to divert at least one of the cartons onto the first divert path from the primary transport path.

In some embodiments, the one or more divert paths comprises a first (e.g., left) divert path and a second (e.g., right) divert path and the overhead reverse diverter is configured to divert a first subset of the cartons moving along the primary transport path onto the first divert path when a first error condition is detected and to divert a second subset of the cartons onto the second divert path when a second error condition is detected. In some embodiments, the first and second error conditions can include, for example, a weight of the carton that is outside of a specified range, illegible text on the carton, a defective carton, a damaged carton, a dimension of the carton that is outside of a specified range, and/or an improperly formed carton. In some embodiments, a third subset of the cartons is not diverted from the primary transport path, but instead passed underneath and out of the overhead reverse diverter to continue along the primary transport path and/or another transport path, which can include a divert path. In some such embodiments, the first, second, and third subsets of cartons comprises an entire number of cartons moving along the primary transport path into the overhead reverse diverter.

In some embodiments, an overhead reverse diverter configured to divert cartons passing under the overhead reverse diverter along a primary transport path is provided. In some such embodiments, the overhead reverse diverter comprises a frame arranged over a space through which the cartons pass along a transport belt, a divert belt, and one or more divert paddles attached to an outer surface of the divert belt, wherein the divert belt is movable through a movement profile around one or more divert spindles attached to one or more divert belt shafts, when the overhead reverse diverter is triggered to divert one or more of the cartons from the primary transport path, such that the one or more divert paddles is configured to travel through the space through which the carton passes as the divert belt moves along the movement profile. In some such embodiments, at least a portion of the cartons moving along the primary transport path are not diverted from the primary transport path by the overhead reverse diverter.

In some embodiments, an overhead reverse diverter configured to divert cartons passing under the overhead reverse diverter along a primary transport path is provided. In some such embodiments, the overhead reverse diverter comprises a frame arranged over a space through which the cartons pass along a transport belt, a divert belt, and one or more divert paddles attached to an outer surface of the divert belt, wherein the divert belt is movable through a movement profile around one or more divert spindles attached to one or more divert belt shafts, when the overhead reverse diverter is triggered to divert one or more of the cartons from the primary transport path, such that the one or more divert paddles is configured to travel through the space through which the carton passes as the divert belt moves along the movement profile. In some such embodiments, the movement profile of the divert belt has a variable speed and/or force.

In some embodiments, an overhead reverse diverter configured to divert cartons passing under the overhead reverse diverter along a primary transport path is provided. In some such embodiments, the overhead reverse diverter comprises a frame arranged over a space through which the cartons pass along a transport belt, a divert belt, and one or more divert paddles attached to an outer surface of the divert belt, wherein the divert belt is movable through a movement profile around one or more divert spindles attached to one or more divert belt shafts, when the overhead reverse diverter is triggered to divert one or more of the cartons from the primary transport path, such that the one or more divert paddles is configured to travel through the space through which the carton passes as the divert belt moves along the movement profile. In some such embodiments, the one or more divert paddles are configured to be actuated repeatedly without the one or more divert paddles returning to a zero position.

In some embodiments, an overhead reverse diverter configured to divert cartons passing under the overhead reverse diverter along a primary transport path is provided. In some such embodiments, the overhead reverse diverter comprises a frame arranged over a space through which the cartons pass along a transport belt, a divert belt, and one or more divert paddles attached to an outer surface of the divert belt, wherein the divert belt is movable through a movement profile around one or more divert spindles attached to one or more divert belt shafts, when the overhead reverse diverter is triggered to divert one or more of the cartons from the primary transport path, such that the one or more divert paddles is configured to travel through the space through which the cartons pass as the divert belt moves along the movement profile. In some such embodiments, the overhead reverse diverter further comprises a first divert spindle and a second divert spindle, wherein the first and second divert spindles are spaced apart from each other, wherein the divert belt wraps around and frictionally engages with the first and second divert spindles, and wherein at least the first divert spindle is configured to rotatably drive the divert belt around the first divert spindle.

In some embodiments, an overhead reverse diverter configured to divert cartons passing under the overhead reverse diverter along a primary transport path is provided. In some such embodiments, the overhead reverse diverter comprises a frame arranged over a space through which the cartons pass along a transport belt, a divert belt, and one or more divert paddles attached to an outer surface of the divert belt, wherein the divert belt is movable through a movement profile around one or more divert spindles attached to one or more divert belt shafts, when the overhead reverse diverter is triggered to divert one or more of the cartons from the primary transport path, such that the one or more divert paddles is configured to travel through the space through which the cartons pass as the divert belt moves along the movement profile. In some such embodiments, the overhead reverse diverter comprises a divert motor configured to provide a rotary force to the first divert spindle and the second divert spindle is configured as an idler spindle that rotates as the divert belt is rotatably driven by the first divert spindle around the circumference of the first divert spindle.

In some embodiments, an overhead reverse diverter configured to divert cartons passing under the overhead reverse diverter along a primary transport path is provided. In some such embodiments, the overhead reverse diverter comprises a frame arranged over a space through which the cartons pass along a transport belt, a divert belt, and one or more divert paddles attached to an outer surface of the divert belt, wherein the divert belt is movable through a movement profile around one or more divert spindles attached to one or more divert belt shafts, when the overhead reverse diverter is triggered to divert one or more of the cartons from the primary transport path, such that the one or more divert paddles is configured to travel through the space through which the cartons pass as the divert belt moves along the movement profile. In some such embodiments, the first divert spindle is supported by a divert belt drive shaft supported (e.g., rotatably) by the frame, and the second divert spindle is supported (e.g., rotatably) by a divert belt idler shaft supported by the frame.

In some embodiments, an overhead reverse diverter configured to divert cartons passing under the overhead reverse diverter along a primary transport path is provided. In some such embodiments, the overhead reverse diverter comprises a frame arranged over a space through which the cartons pass along a transport belt, a divert belt, and one or more divert paddles attached to an outer surface of the divert belt, wherein the divert belt is movable through a movement profile around one or more divert spindles attached to one or more divert belt shafts, when the overhead reverse diverter is triggered to divert one or more of the cartons from the primary transport path, such that the one or more divert paddles is configured to travel through the space through which the cartons pass as the divert belt moves along the movement profile. In some such embodiments, the first divert spindle is supported by a divert belt drive shaft supported (e.g., rotatably) by the frame, and the second divert spindle is supported (e.g., rotatably) by a divert belt idler shaft supported by the frame, wherein the first and second divert spindles are spaced apart in a direction substantially orthogonal to the primary transport path, such that the movement profile of the divert belt is in a plane that is substantially orthogonal to that of the primary transport path.

In some embodiments, an overhead reverse diverter configured to divert cartons passing under the overhead reverse diverter along a primary transport path is provided. In some such embodiments, the overhead reverse diverter comprises a frame arranged over a space through which the cartons pass along a transport belt, a divert belt, and one or more divert paddles attached to an outer surface of the divert belt, wherein the divert belt is movable through a movement profile around one or more divert spindles attached to one or more divert belt shafts, when the overhead reverse diverter is triggered to divert one or more of the cartons from the primary transport path, such that the one or more divert paddles is configured to travel through the space through which the cartons pass as the divert belt moves along the movement profile. In some such embodiments, the movement profile of the divert belt comprises movements of the divert belt in at least two directions, wherein the at least two directions are substantially diametrically opposite from each other.

In some embodiments, an overhead reverse diverter configured to divert cartons passing under the overhead reverse diverter along a primary transport path is provided. In some such embodiments, the overhead reverse diverter comprises a frame arranged over a space through which the cartons pass along a transport belt, a divert belt, and one or more divert paddles attached to an outer surface of the divert belt, wherein the divert belt is movable through a movement profile around one or more divert spindles attached to one or more divert belt shafts, when the overhead reverse diverter is triggered to divert one or more of the cartons from the primary transport path, such that the one or more divert paddles is configured to travel through the space through which the cartons pass as the divert belt moves along the movement profile. In some such embodiments, the overhead reverse diverter comprises at least one homing sensor configured to detect a position of at least one of the one or more divert paddles in a zero position. In some of these embodiments, the overhead reverse diverter further comprises at least one trigger sensor configured to detect a presence of at least one of the cartons in a divert position under the overhead reverse diverter.

In some embodiments, an overhead reverse diverter configured to divert cartons passing under the overhead reverse diverter along a primary transport path is provided. In some such embodiments, the overhead reverse diverter comprises a frame arranged over a space through which the cartons pass along a transport belt, a divert belt, and one or more divert paddles attached to an outer surface of the divert belt, wherein the divert belt is movable through a movement profile around one or more divert spindles attached to one or more divert belt shafts, when the overhead reverse diverter is triggered to divert one or more of the cartons from the primary transport path, such that the one or more divert paddles is configured to travel through the space through which the cartons pass as the divert belt moves along the movement profile. In some such embodiments, the overhead reverse diverter comprises at least one trigger sensor configured to detect a presence of at least one of the cartons in a divert position under the overhead reverse diverter.

In some embodiments, an overhead reverse diverter configured to divert cartons passing under the overhead reverse diverter along a primary transport path is provided. In some such embodiments, the overhead reverse diverter comprises a frame arranged over a space through which the cartons pass along a transport belt, a divert belt, and one or more divert paddles attached to an outer surface of the divert belt, wherein the divert belt is movable through a movement profile around one or more divert spindles attached to one or more divert belt shafts, when the overhead reverse diverter is triggered to divert one or more of the cartons from the primary transport path, such that the one or more divert paddles is configured to travel through the space through which the cartons pass as the divert belt moves along the movement profile. In some such embodiments, the overhead reverse diverter comprises a stop plate configured to stop at least two of the cartons to be diverted along a divert path.

In some embodiments, an overhead reverse diverter configured to divert cartons passing under the overhead reverse diverter along a primary transport path is provided. In some such embodiments, the overhead reverse diverter comprises a frame arranged over a space through which the cartons pass along a transport belt, a divert belt, and one or more divert paddles attached to an outer surface of the divert belt, wherein the divert belt is movable through a movement profile around one or more divert spindles attached to one or more divert belt shafts, when the overhead reverse diverter is triggered to divert one or more of the cartons from the primary transport path, such that the one or more divert paddles is configured to travel through the space through which the cartons pass as the divert belt moves along the movement profile. In some such embodiments, the overhead reverse diverter comprises a transfer case configured to transfer a rotary force from the divert motor to the first divert spindle, for example, via a divert belt drive shaft to which the first divert spindle is fixedly coupled.

In some embodiments, an overhead reverse diverter configured to divert cartons passing under the overhead reverse diverter along a primary transport path is provided. In some such embodiments, the overhead reverse diverter comprises a frame arranged over a space through which the cartons pass along a transport belt, a divert belt, and one or more divert paddles attached to an outer surface of the divert belt, wherein the divert belt is movable through a movement profile around one or more divert spindles attached to one or more divert belt shafts, when the overhead reverse diverter is triggered to divert one or more of the cartons from the primary transport path, such that the one or more divert paddles is configured to travel through the space through which the cartons pass as the divert belt moves along the movement profile. In some such embodiments, the cartons are transported along the primary transport path and under the overhead reverse diverter by a transport belt.

In some embodiments, a method of diverting cartons from a primary transport path is provided. In some such embodiments, the method comprises arranging a frame over the primary transport path; attaching one or more divert paddles to a divert belt, wherein the divert belt is attached to the frame and suspended over the primary transport path so as to not be co-planar with the direction along which the cartons travel along the primary transport path; detecting, using a trigger sensor, a presence of a first carton at a divert position; triggering a movement of the divert belt along a movement profile defined by a movement and/or rotation of the divert belt about and/or around one or more divert spindles; sweeping at least one of the one or more divert paddles across the primary transport path; and diverting the first carton onto one or more divert paths. In some such embodiments, the one or more divert paddles is at least three divert paddles. In some other such embodiments, the one or more divert paths comprises a plurality of divert paths. In some embodiments, the one or more divert paths comprises a first (e.g., left) divert path and the method comprises diverting at least one of the cartons onto the first divert path.

In some embodiments having the plurality of divert paths, the method further comprises arranging at least two (e.g., left and right) of the plurality of divert paths on opposite sides of the primary transport path. In some such embodiments, the at least two of the plurality of divert paths are oriented substantially orthogonally to the primary transport path.

In some embodiments, the movement profile of the drive belt comprises oscillating forward and reverse movements of the divert belt (e.g., in a plane that is not co-planar with the direction of the cartons moving along the primary transport path), such that the overhead reverse diverter is configured to divert the cartons onto one of the plurality of divert paths in an alternating manner.

In some embodiments, the one or more divert paths comprises a first (e.g., left) divert path and a second (e.g., right) divert path, the method comprising diverting a first subset of the cartons onto the first divert path when a first error condition is detected, and diverting a second subset of the cartons onto the second divert path when a second error condition is detected. In some such embodiments, the method comprises not diverting a third subset of the cartons from the transport path so that this third subset of the cartons passes underneath and out of the overhead reverse diverter without being diverted from the primary transport path.

In some embodiments, the movement profile of the divert belt has a variable speed and/or force.

In some embodiments, the method further comprises repeatedly sweeping the one or more divert paddles across the transport path without the one or more divert paddles returning to a zero position.

In some embodiments, the method further comprises arranging a first divert spindle and a second divert spindle spaced apart from each other, wherein the first and second divert spindles are attached to the frame; wrapping the divert belt around the first and second divert spindles to frictionally engage against the first and second divert spindles; and rotating the first divert spindle to move the divert belt through the movement profile. In some such embodiments, the method further comprises generating a force using a divert motor; transmitting the force to the first divert spindle; and rotating the first divert spindle, wherein the second divert spindle is an idler spindle that rotates as the divert belt is driven by the first divert spindle. In some such embodiments, the first divert spindle is supported by a first divert spindle drive shaft supported by the frame and the second divert spindle is supported by a second divert spindle idler shaft supported by the frame. In some such embodiments, the first and second divert spindles are spaced apart in a direction substantially orthogonal to the primary transport path, such that the movement profile of the divert belt is in a plane that is substantially orthogonal to the primary transport path. In some such embodiments, the first and second divert spindles are spaced apart in a direction substantially orthogonal to the primary transport path, such that the movement profile of the divert belt is in a plane that is substantially orthogonal to the primary transport path.

In some embodiments, the method further comprises generating a force using a divert motor; transmitting the force to the first divert spindle; and rotating the first divert spindle, wherein the second divert spindle is an idler spindle that rotates as the divert belt is driven by the first divert spindle.

In some embodiments, transmitting the force to the first divert spindle comprises attaching a transfer case between the divert motor and the first divert spindle to transfer a rotary force therebetween.

In some embodiments, the movement profile of the divert belt comprises movements of the divert belt in at least two directions, wherein the at least two directions are substantially diametrically opposite from each other.

In some embodiments, the method further comprises detecting, using a homing sensor, a position of at least one of the one or more divert paddles when in a zero position.

In some embodiments, the method further comprises detecting, using a trigger sensor, a presence of at least one of the cartons in a divert position under the overhead reverse diverter.

In some embodiments, the method further comprises detecting, using a homing sensor, a position of at least one of the one or more divert paddles when in a zero position and detecting, using a trigger sensor, a presence of at least one of the cartons in a divert position under the overhead reverse diverter.

In some embodiments, the method comprises stopping, using a stop plate, at least two of the cartons in a divert position under the overhead reverse diverter; and diverting the at least two of the cartons along a divert path.

In some embodiments, the cartons are transported along the primary transport path and under the overhead reverse diverter by a transport belt.

While the subject matter has been described herein with reference to specific aspects, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is to be broadly construed and interpreted, as including all such variations, modifications, and alternative embodiments of the invention disclosed herein, within its scope and including all equivalents of the claimed features.

The invention claimed is:

1. An overhead reverse diverter for diverting cartons passing under the diverter along a primary transport path, the diverter comprising:
    a diverter frame over a space through which the cartons are moveable along the primary transport path;
    a divert belt;
    one or more divert paddles attached to the divert belt; and
    a stop plate;
    wherein the divert belt is movable along a movement profile when the diverter is triggered to divert one or more of the cartons from the primary transport path, such that the one or more divert paddles are configured to sweep through the space as the divert belt moves along the movement profile to divert one or more of the cartons from the primary transport path along one or more divert paths;
    wherein the one or more divert paths comprise a first divert path and a second divert path;
    wherein the stop plate is configured to stop multiple cartons, which are to be diverted from the primary transport path onto one of the first or second divert paths, in a divert position under the diverter;
    wherein the diverter is configured to divert a first subset of the cartons onto the first divert path from the primary transport path when a first condition is detected; and
    wherein the diverter is configured to divert a second subset of the cartons onto the second divert path from the primary transport path when a second condition is detected.

2. The diverter of claim 1, wherein the one or more divert paddles comprise at least three divert paddles.

3. The diverter of claim 1, wherein the first and second divert paths are arranged on opposite sides of the primary transport path proximate to the space through which the cartons pass under the diverter.

4. The diverter of claim 3, wherein the first and second divert paths are oriented substantially orthogonally to the primary transport path.

5. The diverter of claim 1, wherein the movement profile comprises oscillating forward and reverse movements of the divert belt, such that the diverter is configured to divert the cartons onto the first and second divert paths in an alternating manner.

6. The diverter of claim 1, wherein the diverter is configured to allow a third subset of the cartons to continue beyond the diverter along the primary transport path.

7. The diverter of claim 6, wherein at least one of the first and second conditions comprises an error condition.

8. The diverter of claim 1, wherein the movement profile has a variable speed and/or force.

9. The diverter of claim 1, wherein the one or more divert paddles are configured for repeated actuation without the one or more divert paddles returning to a zero position.

10. The diverter of claim 1, comprising a first divert spindle and a second divert spindle, wherein:
    the first and second divert spindles are attached to the diverter frame, such that the first and second divert spindles are spaced apart from each other in a direction that is not parallel to a transport direction of the cartons along the primary transport path;
    the divert belt wraps around and frictionally engages with the first and second divert spindles; and
    at least the first divert spindle is configured to be driven by a rotary force, such that the divert belt is driven about the first and second divert spindles.

11. The diverter of claim 10, comprising a divert motor configured to generate the rotary force imparted to the first divert spindle;
    wherein the second divert spindle is an idler spindle that rotates as the divert belt is rotatably driven by the first divert spindle.

12. The diverter of claim 11, comprising a transfer case configured to transfer the rotary force from the divert motor to the first divert spindle.

13. The diverter of claim 10, wherein:
the first divert spindle is coupled to a divert belt drive shaft, which is rotatably coupled to the diverter frame; and
the second divert spindle is coupled to a divert belt idler shaft, which is rotatably coupled to the diverter frame.

14. The diverter of claim 10, wherein the direction in which the first and second divert spindles are spaced apart is oriented substantially orthogonally to the transport direction of the cartons along the primary transport path, such that the movement profile of the divert belt is oriented substantially orthogonally to the transport direction of the cartons along the primary transport path.

15. The diverter of claim 1, wherein:
the movement profile of the divert belt comprises movements of the divert belt in at least two directions; and
the at least two directions are substantially diametrically opposite from each other.

16. The diverter of claim 1, comprising at least one homing sensor configured to detect when at least one of the one or more divert paddles is in a zero position.

17. The diverter of claim 1, comprising at least one trigger sensor configured to detect when one or more of the cartons are in a divert position under the diverter.

18. The diverter of claim 1, wherein the stop plate is movable into and out of the primary transport path based on a number of cartons to be diverted substantially simultaneously from the primary transport path onto either of the first or second divert paths.

19. The diverter of claim 1, wherein the cartons are transported along the primary transport path and under the diverter by a transport conveyor.

20. A method of diverting cartons from a primary transport path, the method comprising:
providing an overhead reverse diverter over the primary transport path, the diverter comprising:
a diverter frame over a space through which the cartons are moveable along the primary transport path;
a divert belt attached to the diverter frame so that the divert belt is suspended over the primary transport path;
one or more divert paddles attached to the divert belt; and
a stop plate;
moving the cartons along the primary transport path and into the space;
stopping, using the stop plate, multiple cartons in a divert position under the diverter, wherein the multiple cartons are designated for being diverted from the primary transport path onto a first divert path or a second divert path;
triggering a movement of the divert belt along a movement profile;
sweeping at least one of the one or more divert paddles across the primary transport path;
diverting a first subset of the cartons from the primary transport path onto the first divert path when a first condition is detected; and
diverting a second subset of the cartons from the primary transport path onto the second divert path when a second condition is detected.

21. The method of claim 20, wherein the one or more divert paddles comprise at least three divert paddles.

22. The method of claim 20 comprising arranging the first and second divert paths on opposite sides of the primary transport path proximate to the space through which the cartons pass under the diverter.

23. The method of claim 22, wherein the first and second divert paths are oriented substantially orthogonally to the primary transport path.

24. The method of claim 20, wherein the movement profile comprises oscillating forward and reverse movements of the divert belt, such that the cartons are diverted onto the first and second divert paths from the primary transport path in an alternating manner.

25. The method of claim 20, comprising allowing a third subset of the cartons to continue beyond the diverter along the primary transport path.

26. The method of claim 25, wherein at least one of the first and second conditions comprises an error condition.

27. The method of claim 20, wherein the movement profile has a variable speed and/or force.

28. The method of claim 20, comprising repeatedly actuating the one or more divert paddles to sweep across the primary transport path without returning to a zero position.

29. The method of claim 20, comprising:
attaching a first divert spindle and a second divert spindle to the diverter frame, such that the first and second divert spindles are spaced apart from each other in a direction that is not parallel to a transport direction of the cartons along the primary transport path;
wrapping the divert belt around the first and second divert spindles to frictionally engage the divert belt with the first and second divert spindles; and
rotating, via a rotary force, the first divert spindle, such that the divert belt is driven about the first and second divert spindles.

30. The method of claim 29, comprising:
generating the rotary force using a divert motor;
transmitting the rotary force to the first divert spindle; and
rotating the first divert spindle;
wherein the second divert spindle is an idler spindle that rotates as the divert belt is rotatably driven by the first divert spindle.

31. The method of claim 29, wherein transmitting the rotary force to the first divert spindle comprises attaching a transfer case to transfer the rotary force from the divert motor to the first divert spindle.

32. The method of claim 29, comprising:
coupling the first divert spindle to a divert belt drive shaft, which is rotatably coupled to the diverter frame; and
coupling the second divert spindle to a divert belt idler shaft, which is rotatably coupled to the diverter frame.

33. The method of claim 29, wherein the direction in which the first and second divert spindles are spaced apart is oriented substantially orthogonally to the transport direction of the cartons along the primary transport path, such that the movement profile of the divert belt is oriented substantially orthogonally to the transport direction of the cartons along the primary transport path.

34. The method of claim 20, wherein:
the movement profile of the divert belt comprises movements of the divert belt in at least two directions; and
the at least two directions are substantially diametrically opposite from each other.

35. The method of claim 20, comprising detecting, using at least one homing sensor, when at least one of the one or more divert paddles is in a zero position.

36. The method of claim 20, comprising detecting, using at least one trigger sensor, when one or more of the cartons is in a divert position under the diverter.

37. The method of claim 20, comprising moving the stop plate into and out of the primary transport path based on a number of cartons to be diverted substantially simultaneously from the primary transport path onto either of the first or second divert paths.

38. The method of claim 20, wherein the cartons are transported along the primary transport path and under the diverter by a transport conveyor.

* * * * *